United States Patent
Pandey et al.

(10) Patent No.: US 10,341,391 B1
(45) Date of Patent: Jul. 2, 2019

(54) NETWORK SESSION BASED USER BEHAVIOR PATTERN ANALYSIS AND ASSOCIATED ANOMALY DETECTION AND VERIFICATION

(71) Applicant: EMC Corporation, Hopkinton, MA (US)

(72) Inventors: Shikhar Pandey, Bangalore (IN); Kartikeya Putturaya, Bangalore (IN); Chandra Sekar Rao Munaganuri Venkata, Bangalore (IN); Gupta Abhishek, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 15/155,475

(22) Filed: May 16, 2016

(51) Int. Cl.
- *H04L 29/06* (2006.01)
- *H04L 29/08* (2006.01)
- *G06F 21/57* (2013.01)

(52) U.S. Cl.
CPC ........ *H04L 63/205* (2013.01); *H04L 63/0272* (2013.01); *H04L 63/1416* (2013.01);
(Continued)

(58) Field of Classification Search
CPC ............. H04L 63/1416; H04L 63/1425; H04L 63/205; H04L 63/1441; H04L 63/0272; G06F 21/577
See application file for complete search history.

(56) References Cited

U.S. PATENT DOCUMENTS

| 6,505,039 B1 | 1/2003 | Boatwright |
| 7,774,842 B2 * | 8/2010 | Mahone ................ H04M 15/00 379/114.14 |

(Continued)

FOREIGN PATENT DOCUMENTS

| CN | 101349987 A | 1/2009 |
| JP | 2002297543 A | 10/2002 |

(Continued)

OTHER PUBLICATIONS

Tamura, Hiroki, Shuji Kawano, and Koichi Tanno. "Unsupervised learning method for a support vector machine and its application to surface electromyogram recognition." Artificial Life and Robotics 14.3 (2009): 362. (Year: 2009).*

(Continued)

*Primary Examiner* — Karl L Schmidt
(74) *Attorney, Agent, or Firm* — Ryan, Mason & Lewis, LLP

(57) ABSTRACT

A processing device in one embodiment comprises a processor coupled to a memory and is configured to obtain data characterizing a plurality of network sessions for a given user identifier. The network sessions are initiated from one or more user devices over at least one network and may comprise respective virtual private network (VPN) sessions. The processing device is further configured to extract features from the obtained data, to detect at least one potentially anomalous network session among the plurality of network sessions for the given user identifier by applying the extracted features to a support vector machine model, and to apply a rules-based verification process to the detected potentially anomalous network session in order to verify that the detected potentially anomalous network session is an anomalous network session. An alert is generated based on (Continued)

a result of the rules-based verification process and transmitted to a security agent.

20 Claims, 17 Drawing Sheets

(52) U.S. Cl.
CPC ...... *H04L 63/1425* (2013.01); *H04L 63/1441* (2013.01); *H04L 67/1097* (2013.01); *H04L 67/141* (2013.01); *G06F 21/577* (2013.01)

(56) References Cited

U.S. PATENT DOCUMENTS

| | | | | |
|---|---|---|---|---|
| 9,407,652 | B1* | 8/2016 | Kesin | G06N 7/005 |
| 9,516,053 | B1* | 12/2016 | Muddu | H04L 63/1425 |
| 10,158,654 | B2* | 12/2018 | Hamdi | H04L 63/1416 |
| 10,164,995 | B1* | 12/2018 | Fang | G06F 16/9024 |
| 10,257,217 | B2* | 4/2019 | Hamdi | H04L 63/1433 |
| 2005/0278703 | A1* | 12/2005 | Lo | G06F 11/0709 |
| | | | | 717/126 |
| 2008/0162338 | A1 | 7/2008 | Samuels et al. | |
| 2010/0153785 | A1* | 6/2010 | Keromytis | G06F 11/08 |
| | | | | 714/38.11 |
| 2013/0097709 | A1* | 4/2013 | Basavapatna | G06F 21/552 |
| | | | | 726/25 |
| 2014/0165207 | A1* | 6/2014 | Engel | H04L 63/1425 |
| | | | | 726/25 |
| 2014/0230051 | A1 | 8/2014 | Vallinayagam et al. | |
| 2014/0237545 | A1* | 8/2014 | Mylavarapu | H04L 63/1433 |
| | | | | 726/3 |
| 2015/0161394 | A1 | 6/2015 | Ferragut et al. | |
| 2015/0213358 | A1* | 7/2015 | Shelton | H04L 41/0604 |
| | | | | 706/47 |
| 2015/0319185 | A1* | 11/2015 | Kirti | H04L 67/306 |
| | | | | 726/23 |
| 2015/0373039 | A1* | 12/2015 | Wang | H04L 63/1425 |
| | | | | 726/23 |
| 2016/0042287 | A1* | 2/2016 | Eldardiry | G06F 21/00 |
| | | | | 706/14 |
| 2016/0078353 | A1* | 3/2016 | Shen | G06Q 10/06 |
| | | | | 706/12 |
| 2016/0092774 | A1* | 3/2016 | Wang | G06N 5/04 |
| | | | | 706/12 |
| 2016/0255105 | A1* | 9/2016 | Palazzo | H04L 63/1416 |
| | | | | 726/23 |
| 2016/0277435 | A1* | 9/2016 | Salajegheh | H04L 63/1416 |
| 2017/0103201 | A1* | 4/2017 | Fox | G06F 21/566 |
| 2017/0149831 | A1* | 5/2017 | Kim | G06N 7/005 |
| 2017/0329314 | A1* | 11/2017 | Shang | H04L 29/06 |

FOREIGN PATENT DOCUMENTS

| | | |
|---|---|---|
| JP | 2005301928 A | 10/2005 |
| WO | 2015043491 A1 | 4/2015 |

OTHER PUBLICATIONS

M. H. Bhuyan, D. K. Bhattacharyya and J. K. Kalita, "Network Anomaly Detection: Methods, Systems and Tools," in IEEE Communications Surveys & Tutorials, vol. 16, No. 1, pp. 303-336, First Quarter 2014. (Year: 2014).*

L. A. Maglaras and J. Jiang, "Intrusion detection in SCADA systems using machine learning techniques," 2014 Science and Information Conference, London, 2014, pp. 626-631. (Year: 2014).*

Menahem, Eitan, Lior Rokach, and Yuval Elovici. "Combining one-class classifiers via meta learning." Proceedings of the 22nd ACM international conference on Information & Knowledge Management. ACM, 2013. (Year: 2013).*

Dorothy E. Denning, "An Intrusion-Detection Model," IEEE Transactions on Software Engineering, Feb. 1987, pp. 222-232, vol. SE-13, No. 2.

C. Xiao et al., "Mobile Speed Estimation for TDMA-Based Hierarchical Cellular Systems," IEEE Transactions on Vehicular Technology, Jul. 2001, pp. 981-991, vol. 50, No. 4.

RSA Security Analytics, "Detect & Investigate Threats," Data Sheet, Oct. 2013, 6 pages.

Y. Wang, "A Multinomial Logistic Regression Modeling Approach for Anomaly Intrusion Detection," Computers and Security, Nov. 2005, pp. 662-674, vol. 24, No. 8.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

U.S. Appl. No. 14/869,354 filed in the name of Richard Chiles on Sep. 29, 2015 and entitled "Automated Detection of Time-Based Access Anomalies in a Computer Network Through Processing of Login Data."

Arvind Thiagarajan, "Probabilistic Models for Mobile Phone Trajectory Estimation," Doctoral Dissertation, Massachusetts Institute of Technology (MIT), Sep. 2011, 161 pages.

G. Chandrasekaran et al., "Vehicular Speed Estimation Using Received Signal Strength from Mobile Phones," 12th ACM International Conference on Ubiquitous Computing (UbiComp), Sep. 26-29, 2010, pp. 237-240, Copenhagen, Denmark.

U.S. Appl. No. 15/079,219 filed in the name of Eyal Kolman on Mar. 24, 2016 and entitled "Automated Detection of Session-Based Access Anomalies in a Computer Network Through Processing of Session Data."

* cited by examiner

NETWORK SESSION BASED USER BEHAVIOR PATTERN ANALYSIS AND ASSOCIATED ANOMALY DETECTION AND VERIFICATION

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defenses typically deployed by enterprise network security systems today often fail at detecting and remediating access anomalies at a sufficiently early stage.

SUMMARY

Illustrative embodiments of the invention provide techniques for automated detection and verification of session-based access anomalies in a computer network. For example, some embodiments process data characterizing virtual private network (VPN) sessions in order to detect potentially anomalous VPN sessions, and apply a rules-based verification process to determine whether or not a given such potentially anomalous VPN session is actually an anomalous VPN session. Such arrangements supplement conventional credential-based authentication techniques and advantageously provide enhanced security against APTs and other types of attacks in enterprise computer networks.

In one embodiment, a processing device comprises a processor coupled to a memory and is configured to obtain data characterizing a plurality of network sessions for a given user identifier. The network sessions are initiated from one or more user devices over at least one network and may comprise respective VPN sessions or other types of network sessions. The processing device is further configured to extract features from the obtained data, to detect at least one potentially anomalous network session among the plurality of network sessions for the given user identifier by applying the extracted features to a support vector machine model for the given user identifier, and to apply a rules-based verification process to the detected potentially anomalous network session in order to verify that the detected potentially anomalous network session is an anomalous network session. An alert is generated based on a result of the rules-based verification process and transmitted to a security agent.

A given processing device configured with functionality for automated detection and verification of anomalous network sessions may be implemented, for example, in one or more network devices of a computer network, or in a security analytics system or other type of network security system associated with the computer network.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
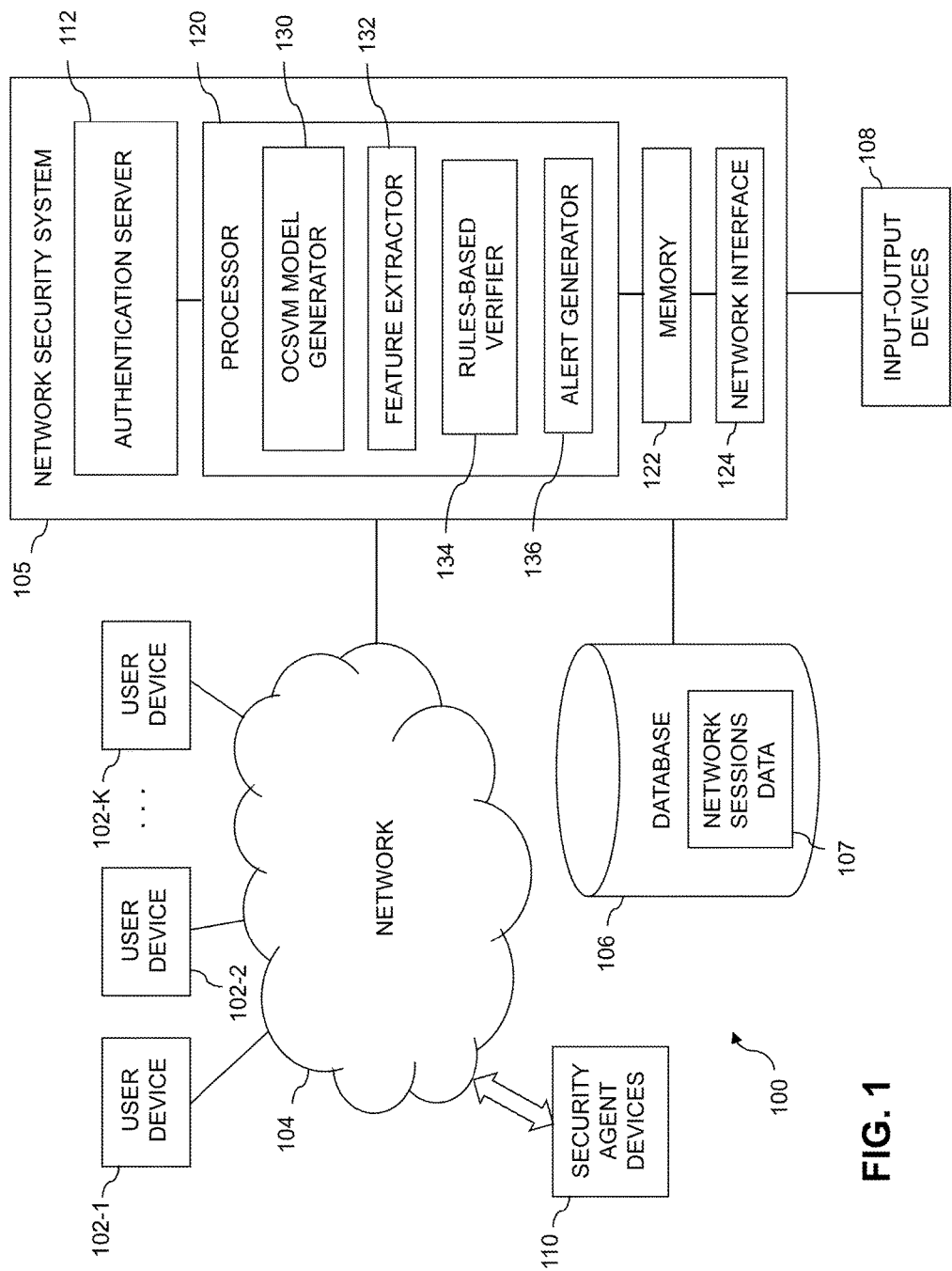
FIG. 1 is a block diagram of a computer network configured for automated detection and verification of network session anomalies through processing of data characterizing network sessions in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store data characterizing multiple network sessions for each of a plurality of distinct user identifiers. The database 106 more particularly stores network sessions data 107 illustratively comprising VPN session data for VPN connections initiated within the computer network 100. It should be noted that the term "network sessions data" as used herein is intended to be broadly construed, and may comprise, for example, authentication data or other types of login data including timestamps and other information associated with login events. Examples of such other information include system logs, authentication logs, geospatial data, etc.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The network sessions data 107 illustratively comprises respective timestamps and other information characterizing successful logins processed in conjunction with users attempting to access protected resources of the computer network 100 via the user devices 102. Information characterizing unsuccessful login events is also assumed to be included. Other types of login events or more generally network session events may be used in other embodiments. As noted above, such network sessions illustratively comprise VPN sessions initiated within the computer network 100.

Also associated with the network security system 105 are input-output devices 108, which illustratively comprise keyboards, displays or other types of input-output devices in any combination. Such input-output devices 108 are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access attempts made from the user device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The network security system 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

In the FIG. 1 embodiment, a successful access attempt is assumed to represent a login event for the corresponding user identifier and is logged in the database 106 as part of the network sessions data 107. Other types of authentication mechanisms and associated login events or other network sessions data can be used in other embodiments. For example, network sessions data in some embodiments can illustratively include additional data characterizing one or more other aspects of a given network session, such as ground speed of a mobile device during the given network session. Numerous techniques for estimating ground speed of a mobile device are known in the art and can be applied in embodiments of the present invention.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises a one-class support vector machine (OCSVM) model generator 130, a feature extractor 132, a rules-based verifier 134 and an alert generator 136.

The OCSVM model generator 130 is an example of what is more generally referred to herein as a "support vector machine model generator." Accordingly, it should be appreciated that embodiments of the invention are not limited to OCSVMs or other particular types of support vector machines. Moreover, other types of unsupervised learning mechanisms can be implemented in other embodiments.

The OCSVM model generator 130 is configured to obtain data characterizing a plurality of network sessions for a given user identifier and to process the data associated with the user identifiers to generate respective OCSVM models for those user identifiers. Each of the user identifiers illustratively identifies a particular user associated with at least a corresponding one of the user devices 102. In addition, at least a subset of the network sessions are illustratively initiated from the user devices 102 over the network 104. As noted above, the network sessions data 107 illustratively includes information relating to login events associated with respective logins initiated from user devices 102 over the network 104, although additional or alternative types of network sessions data could be processed in other embodiments. The processed network sessions data illustratively comprises at least portions of the network sessions data 107 stored in the database 106, although network sessions data can be captured and stored for subsequent processing in the network security system 105 of the computer network 100 in other ways.

The OCSVM model generated for a given one of the user identifiers is illustratively based on a plurality of features extracted at least in part from the data characterizing the network sessions for the given user identifier. Such feature extraction is assumed to be performed by the feature extractor 132 operating in conjunction with the OCSVM model generator 130. For example, the OCSVM model generator 130 illustratively operates in conjunction with the feature extractor 132 to extract features from the obtained data characterizing at least one network session for a given user identifier, and to apply the extracted features to an OCSVM model for the given user identifier in order to detect a potentially anomalous network session. Other arrangements involving additional or alternative modules are possible in conjunction with performing of such feature extraction and OCSVM model application operations.

Examples of features that are extracted by the feature extractor 132 from a particular network session for the given user identifier comprise a device identifier, an external IP address, an internal IP address, a session start time, a session duration, a number of bytes received during the session and a number of bytes sent during the session. Additional examples of extracted features that are used in illustrative embodiments include various derived features such as latitude, longitude, location, region, country, displacement rate, download rate and upload rate.

With regard to displacement rate, this derived feature in illustrative embodiments is defined as the distance traveled between two geographic points divided by the time taken to travel that distance. For each new session, the current location is determined, as well as the location of the previous session. Using the corresponding latitude and longitude features, the distance travelled between the two locations is determined. The time difference between the new and previous sessions is known, and so the displacement rate can be computed. The displacement rate feature determined in this manner allows identification of an anomaly in the form of an impossible or highly unlikely change in location between sessions. Other types of displacement rate features can be used in other embodiments. Some of these features can involve related determinations such as ground speed determinations.

The rules-based verifier 134 applies a rules-based verification process to the detected potentially anomalous network session in order to verify that the detected potentially anomalous network session is an anomalous network session.

The alert generator 136 is configured to generate an alert based on one or more results of the rules-based verification process applied by the rules-based verifier 134. The alert in the present embodiment is assumed to be transmitted via the network interface 124 over the network 104 to a security agent associated with one of the security agent devices 110. The alert illustratively relates to a current network session or a plurality of network sessions for a given user identifier. In other embodiments, multiple alerts of different types can be generated relating to a current network session or a plurality of network sessions for the given user identifier. As mentioned previously, the network sessions illustratively comprise respective VPN sessions.

Additional description regarding more detailed examples of network sessions, extracted features, OCSVM models and rules-based verification processes that are used in illustrative embodiments will be provided below.

The arrangement described above advantageously permits the network security system 105 to focus its efforts on the particular ones of the user devices 102 that are most likely subject to attacks. Accordingly, the limited resources of the network security system 105 available for attack detection and remediation can be more intelligently and effectively deployed in the computer network 100, resulting in improved performance as well as enhanced security against APTs and other types of attacks.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the OCSVM model generator 130, feature extractor 132, rules-based verifier 134 and alert generator 136 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It is to be understood that the particular set of elements shown in FIG. 1 for automatically detecting session-based access anomalies involving user devices 102 of computer network 100 and for automatically implementing remedial measures based on the detected session-based access anomalies is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, OCSVM model generator 130, feature extractor 132, rules-based verifier 134 and alert generator 136 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the network sessions data 107 stored in the database 106 illustratively comprise security logs collected by the STEM system.

An exemplary process utilizing OCSVM model generator 130, feature extractor 132, rules-based verifier 134 and alert generator 136 of the network security system 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. These steps are assumed to be performed by the processor 120 utilizing its modules 130, 132, 134 and 136.

In step 200, data characterizing at least one network session for a given user identifier is obtained. At least a portion of the one or more network sessions are assumed to be comprise VPN sessions initiated from user devices 102 over the network 104, although other types of network sessions can be processed in other embodiments. The data processed in step 200 may include, for example, network sessions data 107 obtained by the network security system 105 from the database 106. As mentioned previously, such data can include, for example, information characterizing login events associated with respective logins initiated from user devices 102 over the network 104, as well as additional or alternative network sessions data illustratively relating to VPN sessions in computer network 100.

The user identifier may comprise a username or other type of user identifying information as well as combinations of multiple instances of such information of different types. The term "user identifier" is therefore intended to be broadly construed.

In step 202, features are extracted from the obtained data. By way of example, the extracted features in some embodiments comprise a device identifier, an external IP address, an internal IP address, a session start time, a session duration, a number of bytes received during the session and a number of bytes sent during the session, as well as one or more additional features derived therefrom, such as latitude, longitude, location, region, country, displacement rate, download rate and upload rate. These and other derived features are intended to be encompassed by the general term "extracted features" as that term is broadly used herein. Subsets of the above-noted extracted features as well as additional or alternative sets of extracted features can be used in other embodiments. Other examples of extracted features that may be used in a given embodiment are described in U.S. patent application Ser. No. 15/079,219, filed Mar. 24, 2016 and entitled "Automated Detection of Session-Based Access Anomalies in a Computer Network through Processing of Session Data," which is commonly assigned herewith and incorporated by reference herein.

In some embodiments, it is assumed that the features extracted in step 202 are extracted from a current network session for the given user identifier, and that an OCSVM model has been previously generated for the given user identifier based on features extracted from one or more previous network sessions for the given user identifier. The features extracted from the current network session in such an embodiment illustratively include the same set of features that were extracted from other network sessions for the given user identifier in generating the corresponding OCSVM model.

In step 204, the extracted features are applied to the OCSVM model for the given user identifier in order to detect a potentially anomalous network session. The detected potentially anomalous network session illustratively comprises a particular network session that deviates from a behavior pattern of the given user identifier as characterized by the OCSVM model for the given user identifier.

Figure 3:
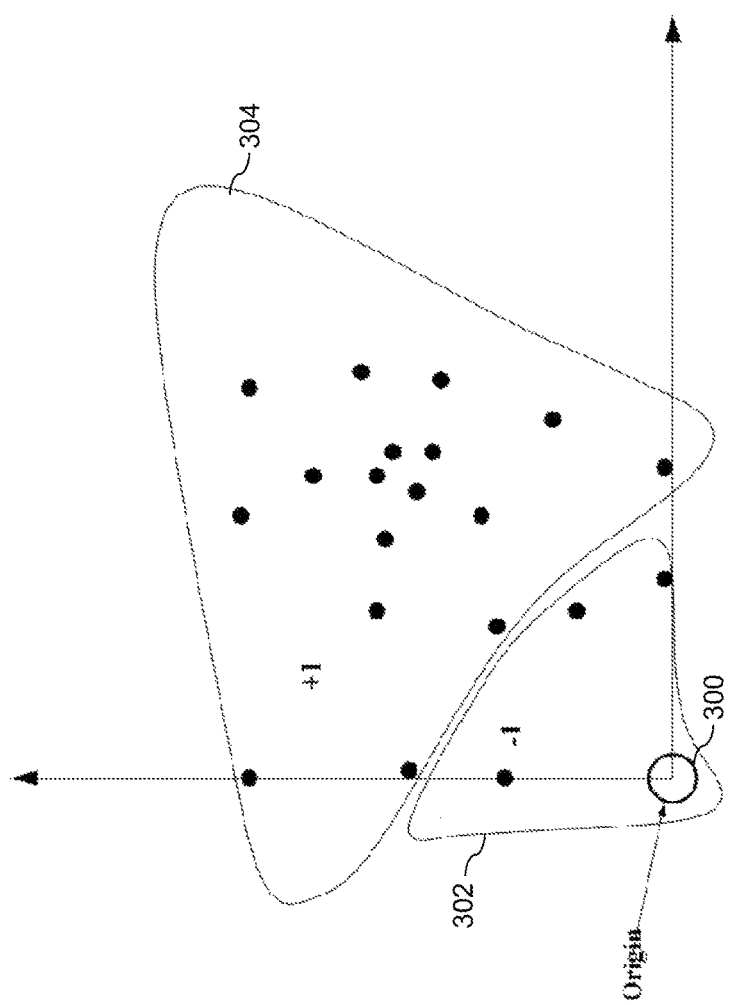
FIG. 3 is a graphical plot showing the operation of a one-class support vector machine model in an illustrative embodiment.

As will be described in more detail below in conjunction with FIG. 3, the OCSVM model in some embodiments utilizes a Gaussian kernel function to determine a decision boundary for the model. The decision boundary separates normal network sessions within a learned class defining the behavior pattern for the given user identifier from potentially anomalous network sessions not within the learned class.

By way of example, the detected potentially anomalous network session may be a current network session for the given user identifier, with the OCSVM model that characterizes the behavior pattern for the given user identifier being based on a plurality of previous network sessions for that user identifier.

In step 206, a rules-based verification process is applied to the detected potentially anomalous network session in order to verify that the session is actually anomalous. An alert is generated by the alert generator 136, assuming that the rules-based verification process indicates an actually anomalous network session. Such an alert need not be generated if the detected potentially anomalous network session is not confirmed as anomalous by the rules-based verification process of step 206. Examples of network session anomaly indication rules that are applied in rules-based verification processes in illustrative embodiments will be described below in conjunction with FIGS. 4 through 17.

In some embodiments, a current network session is processed in real time by the network security system 105, responsive to initiation of the current network session within the computer network 100. In other embodiments, the current network session can be processed as part of a batch of additional network sessions retrieved from the database 106 at one of a plurality of periodic processing intervals. The network security system 105 can therefore be configured, for example, to support a real-time processing mode of operation, a batch processing mode of operation, or combinations of real-time processing, batch processing or other types of processing modes.

In step 208, the alert is provided to a security agent and one or more automated remedial actions are taken in the network security system 105. For example, the alert may be transmitted over the network 104 to one of the security agent devices 110. The automated remedial actions can illustratively include, for example, requiring submission of one or more additional authentication factors from a given one of the user devices 102 that is determined to be associated with an anomalous network session. Such remedial actions can include terminating the current network sessions or suspending the current network session until the one or more additional authentication factors are obtained and verified. Although step 208 refers to generation of a single alert, it is possible for multiple alerts to be generated relative to respective different alert generation thresholds.

A corresponding anomaly category for a particular detected and verified anomalous network session can be provided in conjunction with the alert. Also, different anomaly categories can result in generation of different types of alerts.

In step 210, the OCSVM model for the given user identifier is updated. For example, the OCSVM model can be continuously or periodically tuned based on the current network session and possibly one or more additional network sessions that occur for a particular user identifier within the computer network 100.

The updating of the OCSVM model for the given user identifier in some embodiments comprises classifying a given one of the network sessions as a non-anomalous network session, and incorporating the extracted features of the given network session and its classification as a non-anomalous network session into the OCSVM model as a new observation. For example, if application of the rules-based verification process in step 206 indicates that a detected potentially anomalous network session is not an actually anomalous network session, that network session may be classified as a non-anomalous network session and the corresponding extracted features and the classification incorporated into the OCSVM model.

Figure 2:
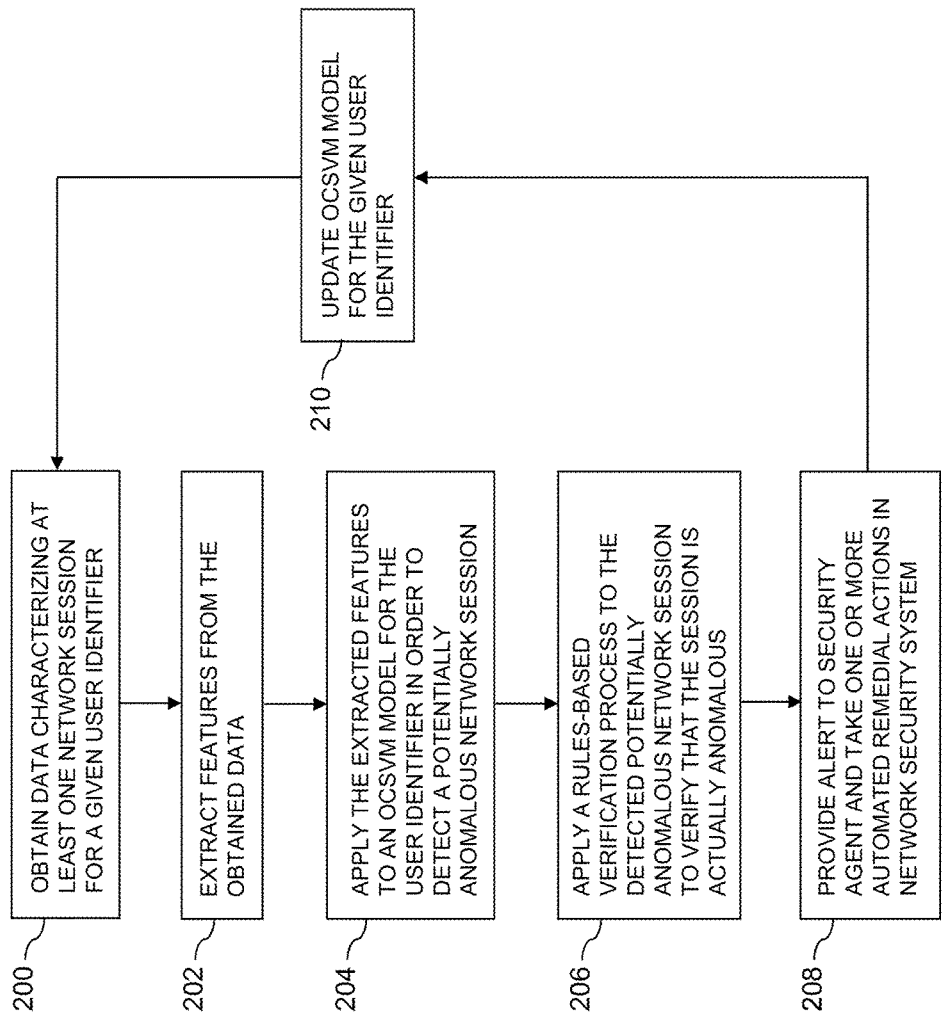
FIG. 2 is a flow diagram of a process for automated detection and verification of network session anomalies in an illustrative embodiment.

Alternatively, a given network session classified as a non-anomalous network session may comprise a network session that is not determined to be a potentially anomalous network session in step 204 of the FIG. 2 process.

As another example, a given network session classified as a non-anomalous network session in conjunction with the updating of the OCSVM model in step 210 may comprise one of the plurality of sessions that is initially determined to be an anomalous network session in step 206 but subsequently characterized as a false positive, possibly through user feedback responsive to a generated alert.

Again, in either of these additional examples, the corresponding extracted features and the classification are incorporated into the OCSVM model as a new observation in conjunction with updating step 210.

Additional instances of steps 200 through 210 can be performed responsive to occurrence of additional network sessions for respective user identifiers or may otherwise be repeated periodically in order to ensure that anomalous network sessions are accurately and efficiently detected and verified within the computer network 100.

Numerous other techniques can be used in association with detection and verification of anomalous network sessions through processing of data characterizing multiple network sessions for each of a plurality of user identifiers. For example, alternative processes can include other types and arrangements of automated remedial actions in response to a detected and verified anomalous network session.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect and verify anomalous network sessions and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of anomalous session detection and verification performed for different network sessions and possibly for different user identifiers.

The FIG. 2 process may be viewed as an example illustrating portions of a multi-phase process for network session based user behavior pattern analysis and associated anomaly detection and verification. Such a multi-phase process in one possible implementation illustratively comprises at least the following four distinct phases, although different arrangements of multiple phases can be used in other implementations:

Phase 1: Feature extraction from VPN sessions data;
Phase 2: Detection of potentially anomalous sessions;
Phase 3: Rules-based verification; and
Phase 4: Continuous unsupervised learning via feedback from end users.

Additional details regarding each of these phases will be provided below.

As mentioned previously, the features extracted from VPN sessions data or other types of data characterizing network sessions for a given user identifier are utilized to generate an OCSVM model for that user identifier. Both the feature extraction and the OCSVM model generation are illustratively performed in Phase 2 of the multi-phase process noted above. The generation of an OCSVM model utilizing features extracted from VPN session logs will now be described in more detail with reference to FIG. 3, which illustrates the operation of an OCSVM model in one embodiment.

An OCSVM model in this embodiment comprises an unsupervised learning algorithm that determines a decision boundary for classifying new observations as either similar to or distinct from previous observations. The previous observations are referred to as the "training data" for the OCSVM model. Observations that deviate sufficiently from a learned class of similar observations are also referred to as "outliers." The learned class defines a behavior pattern for the corresponding user identifier. The similar observations within the learned class correspond to normal network sessions, while the outliers are considered potentially anomalous network sessions. The OCSVM model used in the present embodiment is a one-class model as there is only a single learned class corresponding to the normal behavior pattern for the given user identifier.

The OCSVM model in this embodiment more particularly groups multiple data points relative to an origin 300. A small number of data points are shown as part of a group 302 that includes the origin 300 and is on an outlier side of the decision boundary. This group 302 is denoted as the −1 group. All other data points are part of the group 304 that represents the single class of similar observations falling on the non-outlier side of the decision boundary, also denoted as the +1 group. The decision boundary determined by the OCSVM model separates the normal network sessions within the learned class defining the behavior pattern for the given user identifier from potentially anomalous network sessions not within the learned class.

The OCSVM model in this embodiment is configured to utilize a Gaussian kernel function to project training data of a lower-dimensional space into a higher-dimensional space. Other types of kernel functions that can be used in other embodiments include linear, polynomial and sigmoid kernel functions. The Gaussian kernel function is also referred to as a radial basis function. The Gaussian kernel function in this embodiment more particularly defines an implicit transformation function $\Phi(\cdot)$ that projects data points into the higher-dimensional space and learns the decision boundary that separates the majority of the data points from the origin. The decision boundary is also referred to as a hyperplane.

The Gaussian kernel function in particular guarantees the existence of such a decision boundary, and is therefore well suited to deal with any arbitrary dataset. Let the function g(x) be defined as follows:

$$g(x) = w^T \phi(\cdot) - p,$$

where w is a vector perpendicular to the decision boundary and p is a bias term. The decision function that the OCSVM model uses in order to identify normal data points then becomes:

$$f(x) = \text{sgn}(g(x)).$$

This decision function returns a positive value of +1 for normal data points, and a negative value of −1 otherwise.

The primary objective of an OCSVM model in the present embodiment is illustratively defined as follows:

$$\min_{w, \xi, \rho} \frac{\|w\|^2}{2} - \rho + \frac{1}{vn} \sum_{i=1}^{n} \xi_i$$

$$\text{subject to: } w^T \phi(x_i) \geq \rho - \xi_i, \xi_i \geq 0$$

Here, $\xi_i$ is a slack variable for point i that allows it to lie on the other side of the decision boundary, n is the number of data points in the training data set and v is a regularization parameter. The first part of the primary objection involves the distance to the decision boundary. The decision boundary is illustratively defined as:

$$g(x) = 0.$$

In this context, the distance of any arbitrary data point to the decision boundary can be computed as:

$$d(x) = \frac{|g(x)|}{\|w\|}$$

Thus, the distance that the unsupervised learning algorithm attempts to maximize can be obtained by plugging the origin into the equation yielding $$\frac{\rho}{\|w\|}.$$

This can also be stated as the minimization of $$\left(\frac{\|w\|^2}{2}\right) - \rho.$$

The second part of the primary objective is the minimization of the slack variables $\xi_i$ for all data points. The variable v is the regularization parameter and it represents an upper bound on the fraction of outliers and a lower bound on the number of support vectors. Varying v controls the trade-off between $\xi$ and $\rho$.

To this end, the primary objective in the present embodiment is illustratively transformed in the manner shown below. This transformation allows the OCSVM model to utilize the above-noted Gaussian kernel function as well as to reduce the number of variables to one vector. It basically yields a Quadratic Programming (QP) optimization objective where Q is a kernel matrix and a values are Lagrange multipliers.

$$\min_{\alpha} \frac{\alpha^T Q \alpha}{2}$$

$$\text{subject to: } 0 \leq \alpha_i \leq \frac{1}{vn}, \sum_{i=1}^{n} \alpha_i = 1$$

As mentioned previously, an OCSVM model utilizing a Gaussian kernel function as described above classifies data points as either belonging to the learned class, and therefore part of the +1 group 304, or not belonging to the learned class, and therefore part of the −1 group 302 that includes the origin 300.

It is to be appreciated that the particular features of the OCSVM model in the illustrative embodiment described above are presented by way of example only, and should not be construed as limiting in any way. Those skilled in the art will recognize that the various kernel functions, objective functions, parameters and other features of the model, as well as the particular type of model used, can be varied in other embodiments.

As indicated above, a separate OCSVM model is generated for each user in some embodiments, with the users being identified by their respective unique user identifiers.

In the detection of potentially anomalous network sessions in Phase 2 of the multi-phase process, one or more network sessions for a given user identifier are processed by the corresponding OCSVM model. It is expected that in some implementations, most of the VPN sessions are normal sessions, and anomalous sessions exist only in relatively small numbers. The OCSVM model described above provides a binary classifier that is customized for unsupervised learning of the class of normal VPN sessions and detection of potentially anomalous sessions as outliers relative to the learned class.

In application of the rules-based verification in Phase 3 of the multi-phase process, VPN sessions classified as potential anomalies are verified against a set of correlated rules. Such an arrangement helps to provide context around those potentially anomalous sessions that are actually deemed to be anomalous, thereby facilitating root cause identification by network security personnel.

It should also be noted that some embodiments can apply rules-based verification to all network sessions, including those identified as potentially anomalous as well as those not identified as potentially anomalous. Such an arrangement recognizes that network breaches can sometimes occur in a manner that does not deviate from a learned pattern of behavior. Accordingly, the application of rules-based verification is not limited to only those sessions identified as potentially anomalous.

The continuous unsupervised learning of Phase 4 in some embodiments occurs as users initiate additional network sessions within the computer network and those sessions are classified by the OCSVM model. For example, users or network security personnel can provide feedback indicating that a particular network session determined to be anomalous was actually a false positive. A similar arrangement can be used to confirm reported anomalies as true positives. Accordingly, feedback indicating false positives or confirming true positives can be utilized in updating the OCSVM model.

A detailed example of one possible implementation of a multi-phase process of the type described above is shown in the Appendix. In this example, the process is more particularly configured for detection and verification of anomalous VPN sessions in a computer network, but the disclosed techniques can be adapted for use in automated detection and verification of other types of anomalous network sessions.

Examples of rules suitable for use in rules-based verification in one or more illustrative embodiments will now be described with reference to the flow diagrams of FIGS. 4 through 17. The rules are illustratively referred to as respective example network session anomaly indication rules of a rules-based verification process.

The examples of FIGS. 4 through 17 more particularly include respective rules that indicate anomalies denoted by anomaly codes 10000 through 10013. Each of these rules will be described separately below. Some of the rules utilize portions of network sessions data 107 as well as various related databases that are assumed for purposes of illustration to comprise portions of the database 106 in the context of the FIG. 1 embodiment, although it should be understood that other database arrangements could be used.

Figure 4:
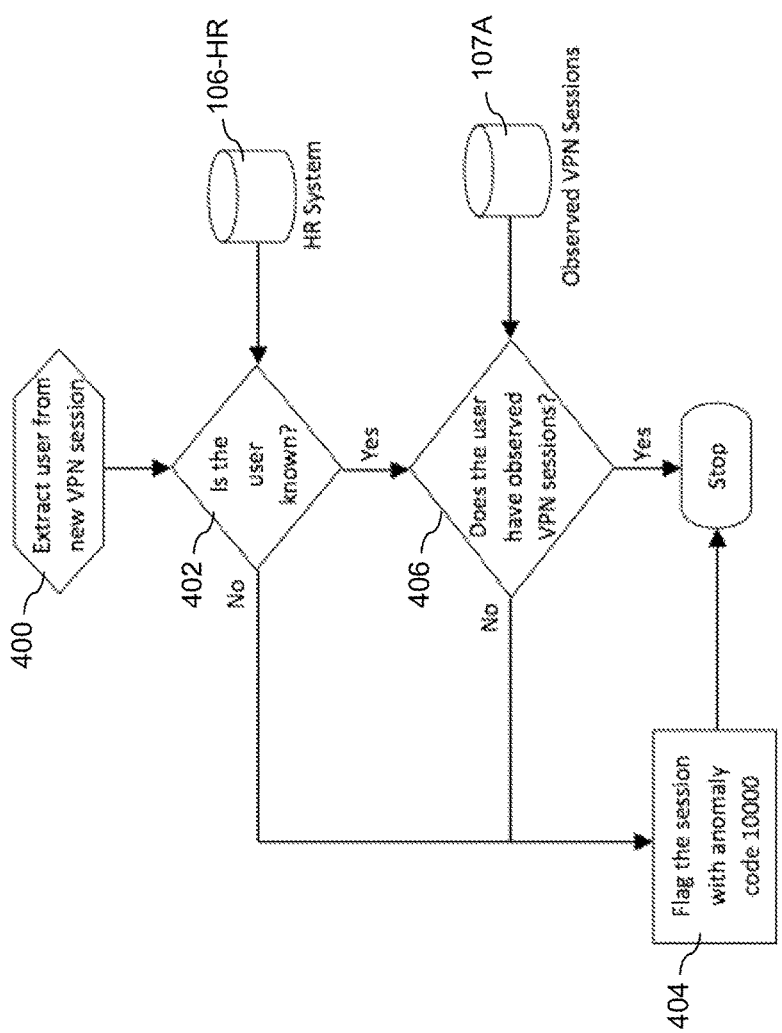
FIGS. 4 through 17 are flow diagrams illustrating respective example network session anomaly indication rules of a rules-based verification process in an illustrative embodiment.

FIG. 4 illustrates a rule that indicates an anomaly if a network session is initiated by an unknown user or a known user that has not previously initiated a network session. More particularly, anomaly code 10000 is reported when a known user uses the VPN for the first time or an unknown user starts using VPN. This information is useful to identify unauthorized username creation or to monitor the VPN behavior of a first time user.

In step 400, the identity of the user is extracted from a new VPN session. The identity of the user illustratively comprises a username or other user identifier. Step 402 then determines if the user is known, using information from a database 106-HR of a human resources (HR) system of the company, organization or other enterprise that controls the computer network. If the user is not known from the HR data, the session is flagged with anomaly code 10000 in step 404. Otherwise, the user associated with the new VPN session is a known user, and a determination is made in step 406 as to whether or not the known user has any observed VPN sessions, utilizing a database of observed VPN sessions 107A which represents a portion of the network sessions data 107 of FIG. 1. If the known user does not have any observed sessions, the new VPN session is flagged with anomaly code 10000 in step 404. Otherwise, the process ends without flagging the new VPN session with that anomaly code.

Figure 5:
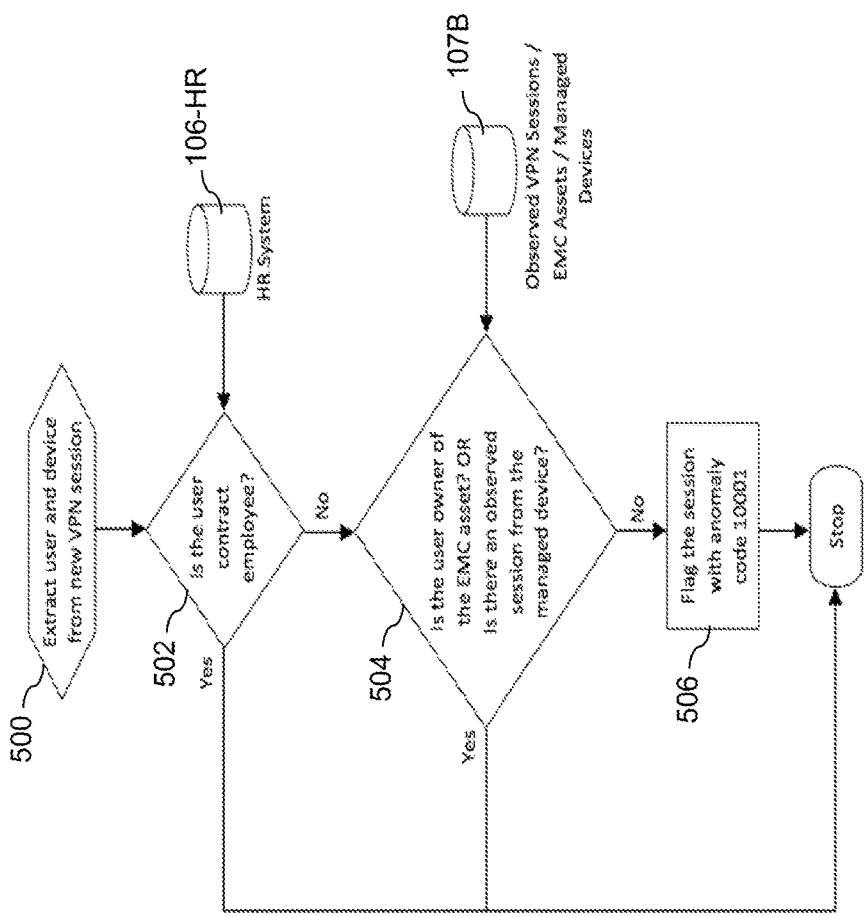

FIG. 5 illustrates a rule that indicates an anomaly if a network session for a given user identifier is initiated from a user device not previously associated with that user identifier. More particularly, anomaly code 10001 is reported when a user creates a VPN session from a new device that is not registered to that user. A device can be an enterprise asset, illustratively referred to as an "EMC asset" in the context of these examples. Examples of enterprise assets include desktop computers or laptop computers that belong to the enterprise that employs the user. Managed devices illustratively include mobile phones or tablet computers that belong to the employee but are utilized to access the enterprise VPN. Further, contract employees can log into VPN from devices not listed as EMC assets or managed devices. Instances of compromised credentials can be identified through this anomaly. The anomaly is not checked for if anomaly code 10000 is already reported for the new VPN session.

In step 500, the identity of the user and the corresponding user device is extracted from a new VPN session. The identity of the user illustratively comprises a username or other user identifier, and the identity of the user device illustratively comprises a device identifier. Step 502 then determines if the user is a contract employee, using information from database 106-HR. If the user is a contract employee, the process ends as indicated. Otherwise, step 504 determines if the user is the registered "owner" of the EMC asset or if there has been a previously observed session from a managed device, utilizing a database of observed VPN sessions, EMC assets and managed devices 107B which represents a portion of the network sessions data 107 of FIG. 1. An affirmative result from the determination in step 504 causes the process to end as indicated, but a negative result from the determination in step 504 causes the session to be flagged with anomaly code 10001 in step 506, after which the process ends as indicated.

Figure 6:
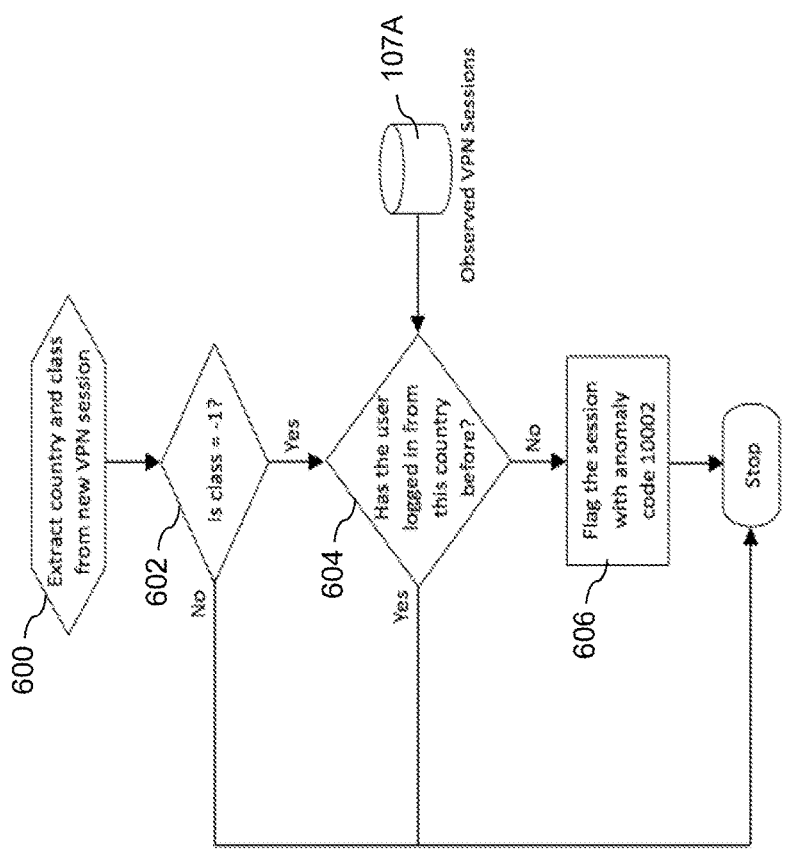

FIG. 6 illustrates a rule that indicates an anomaly if a network session for a given user identifier is initiated from a country not previously associated with that user identifier. More particularly, anomaly code 10002 is reported when a user initiates a session from a country from which the user has not previously initiated a session. Again, instances of compromised credentials can be identified through this anomaly, and the anomaly is not checked for if anomaly code 10000 is already reported for the new VPN session.

In step 600, the country and class are extracted from a new VPN session. Step 602 then determines if the class is −1, indicating a potentially anomalous session. If the class is not −1, the new network session is considered consistent with the established user behavior pattern, and the process ends as indicated. For example, the behavior pattern may indicate that the user is a frequent traveler that often visits new countries. Otherwise, step 604 determines if the user has previously logged in from the country at issue. This involves utilization of the database of observed VPN sessions 107A. An affirmative result from the determination in step 604 causes the process to end as indicated, but a negative result from the determination in step 604 causes the session to be flagged with anomaly code 10002 in step 606, after which the process ends as indicated.

Figure 7:
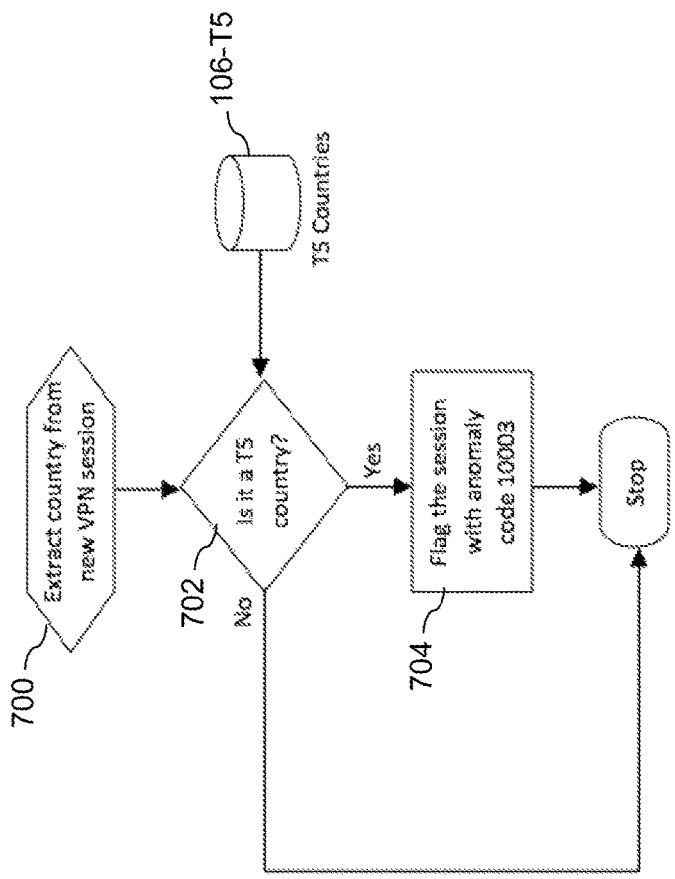

FIG. 7 illustrates a rule that indicates an anomaly if a network session is initiated from a restricted country. More particularly, anomaly code 10003 is reported when a VPN session is initiated from a so-called T5 country, which may comprise, for example, a list of embargoed countries.

In step 700, the country is extracted from a new VPN session. Step 702 then determines if the country is a T5 country, utilizing a database 106-T5 of T5 countries. If the country is not a T5 country, the process ends as indicated. An affirmative result from the determination in step 702 causes the session to be flagged with anomaly code 10003 in step 704, after which the process ends as indicated.

Figure 8:
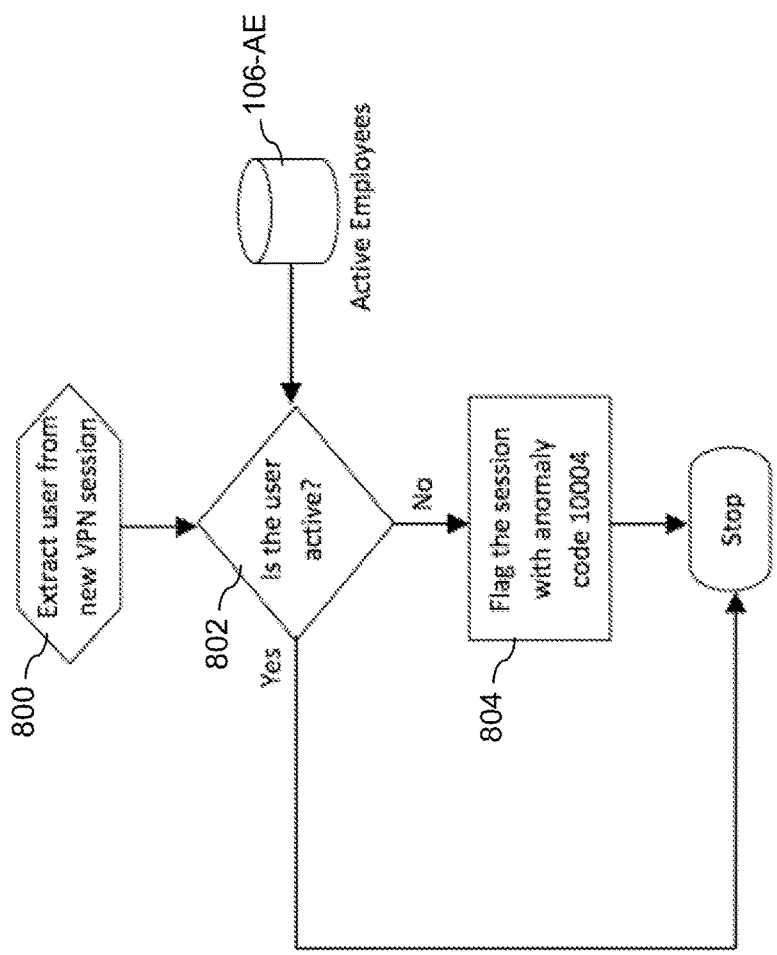

FIG. 8 illustrates a rule that indicates an anomaly if a network session is initiated for an inactive user identifier. More particularly, anomaly code 10004 is reported when a VPN session is initiated for an inactive username or other type of user identifier. As in some of the previous rules, instances of compromised credentials can be identified through this anomaly, and the anomaly is not checked for if anomaly code 10000 is already reported for the new VPN session.

In step 800, the identity of the user is extracted from a new VPN session. Step 802 then determines if the user is an active user, utilizing a database 106-AE of active employees. If the determination in step 802 is that the user is an active user, that is, one having an active user identifier, the process ends as indicated. Otherwise, a negative result from the determination in step 802 causes the session to be flagged with anomaly code 10004 in step 804, after which the process ends as indicated.

Figure 9:
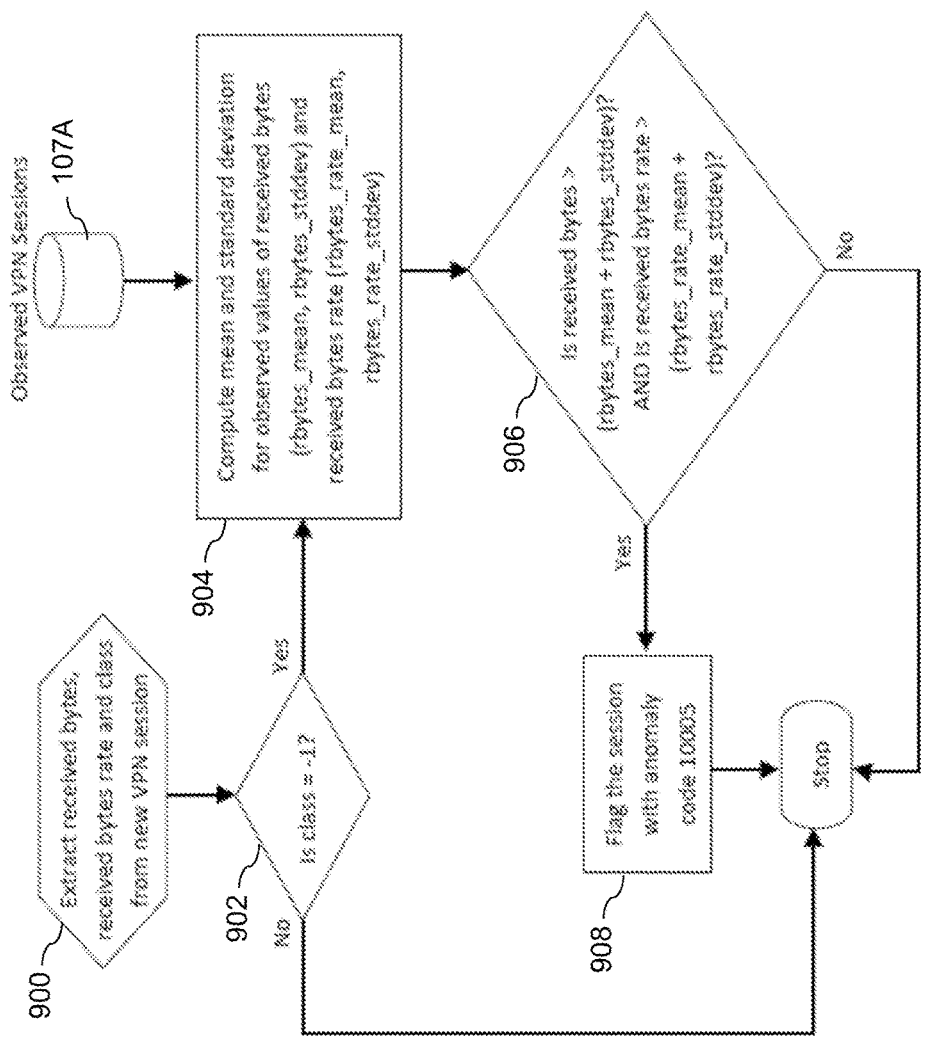

FIG. 9 illustrates a rule that indicates an anomaly if an abnormal amount of data is downloaded during a network session. More particularly, anomaly code 10005 is reported if there is an abnormal amount of data downloaded during the network session. Instances of threats to enterprise data can be identified through this anomaly.

In step 900, the received bytes, received bytes rate and class are extracted from a new VPN session. Step 902 then determines if the class is −1, indicating a potentially anomalous session. If the class is not −1, the new network session is considered consistent with the established user behavior pattern, and the process ends as indicated. For example, the behavior pattern may indicate that the user normally downloads large files at a high rate. If the class is −1, the process moves to step 904 to compute mean and standard deviation for observed values of received bytes and received bytes rate. This involves utilization of the database of observed VPN sessions 107A. Step 906 then determines if the received bytes and received bytes rate are both greater than their corresponding mean plus standard deviation. A negative result from the determination in step 906 causes the process to end as indicated, but an affirmative result from the determination in step 906 causes the session to be flagged with anomaly code 10005 in step 908, after which the process ends as indicated.

Figure 10:
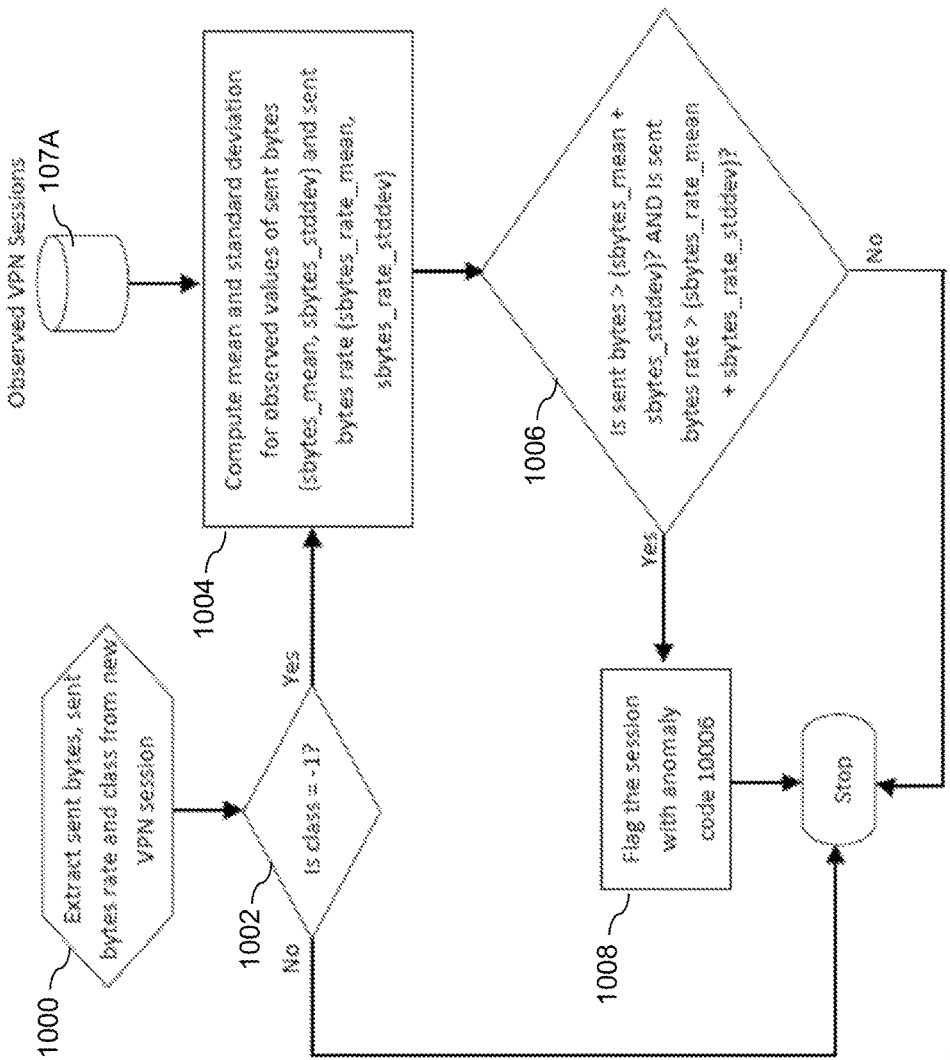

FIG. 10 illustrates a rule that indicates an anomaly if an abnormal amount of data is uploaded during a network session. More particularly, anomaly code 10006 is reported if there is an abnormal amount of data uploaded during the network session. Again, instances of threats to enterprise data can be identified through this anomaly.

In step 1000, the sent bytes, sent bytes rate and class are extracted from a new VPN session. Step 1002 then determines if the class is −1, indicating a potentially anomalous session. If the class is not −1, the new network session is considered consistent with the established user behavior pattern, and the process ends as indicated. For example, the behavior pattern may indicate that the user normally uploads large files at a high rate. If the class is −1, the process moves to step 1004 to compute mean and standard deviation for observed values of sent bytes and sent bytes rate. This involves utilization of the database of observed VPN sessions 107A. Step 1006 then determines if the sent bytes and sent bytes rate are both greater than their corresponding mean plus standard deviation. A negative result from the determination in step 1006 causes the process to end as indicated, but an affirmative result from the determination in step 1006 causes the session to be flagged with anomaly code 10006 in step 1008, after which the process ends as indicated.

Figure 11:
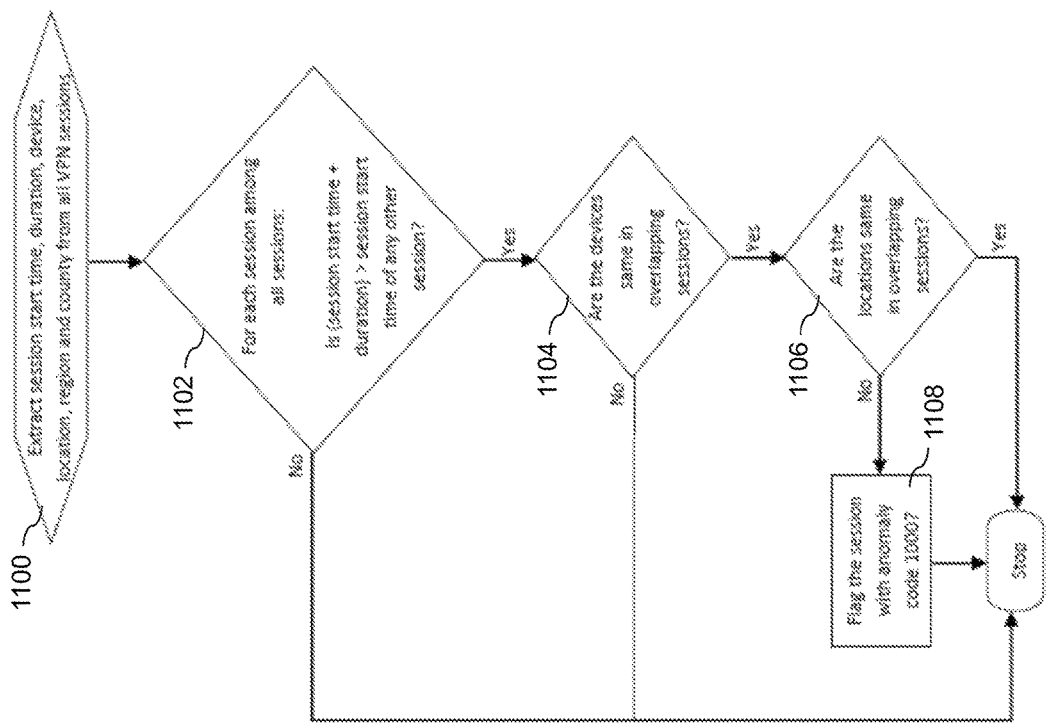

FIG. 11 illustrates a rule that indicates an anomaly if multiple overlapping network sessions are initiated from the same user device at different locations. More particularly, anomaly code 10007 is reported if there are overlapping sessions from the same device, with each session being from a different location. Two sessions are considered overlapping in this example if the end time of the first session is after the start time of the second session. Instances of compromised credentials can be identified through this anomaly. The anomaly is not checked for if the user is a contract employee having a base location outside of the enterprise.

In step 1100, the session start time, duration, device, location, region and country are extracted from all VPN sessions to be considered. Step 1102 then determines for each of the sessions being considered whether or not the start time for that session plus its duration is greater than the session start time of any other one of the sessions. A negative determination in step 1102 causes the process to end as indicated. Otherwise, step 1104 determines if the same devices are used for the overlapping sessions. If not, the process ends as indicated, and otherwise moves to step 1106 to determine if the locations are the same for the overlapping sessions. A negative determination in step 1106 causes the session currently under consideration to be flagged with anomaly code 10007 in step 1108. Otherwise, the process ends without flagging the session with that anomaly code.

Figure 12:
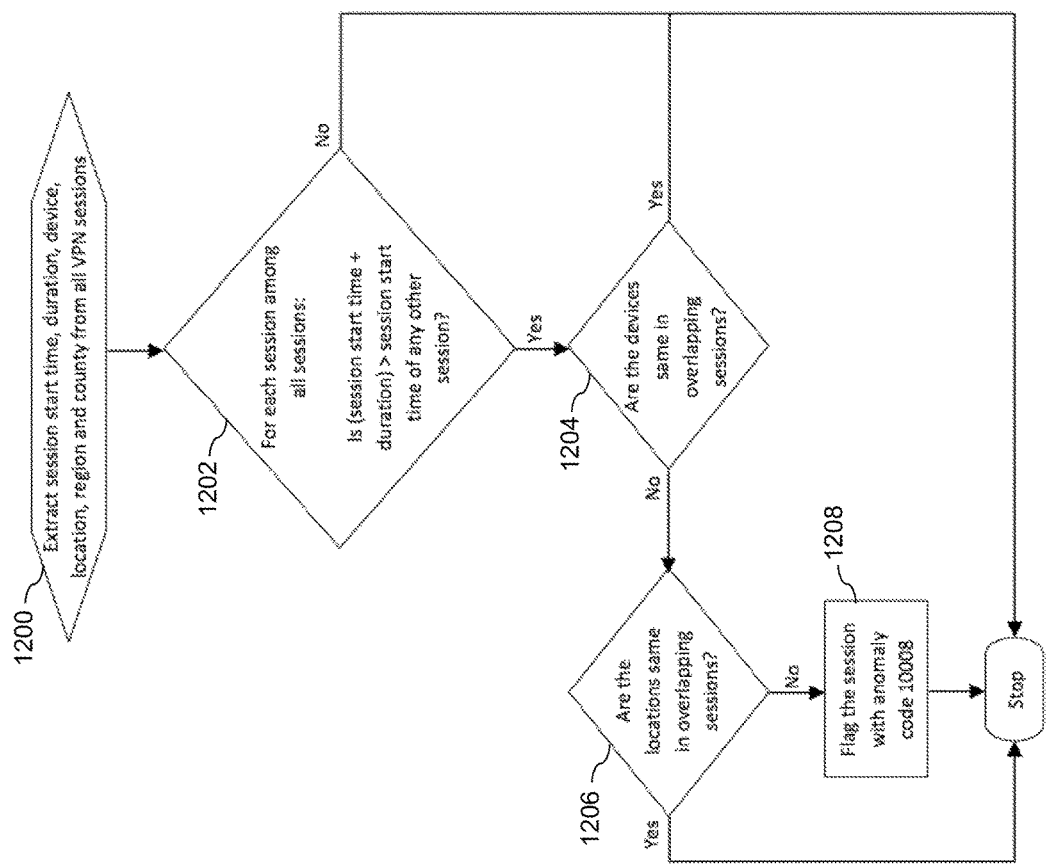

FIG. 12 illustrates a rule that indicates an anomaly if multiple overlapping network sessions are initiated from different user devices at different locations. More particularly, anomaly code 10008 is reported if there are overlapping sessions from different devices, with each session being from a different location. As in the previous example, two sessions are considered overlapping in this example if the end time of the first session is after the start time of the second session. Again, instances of compromised credentials can be identified through this anomaly, and the anomaly is not checked for if the user is a contract employee having a base location outside of the enterprise.

In step 1200, the session start time, duration, device, location, region and country are extracted from all VPN sessions to be considered. Step 1202 then determines for each of the sessions being considered whether or not the start time for that session plus its duration is greater than the session start time of any other one of the sessions. A negative determination in step 1202 causes the process to end as indicated. Otherwise, step 1204 determines if the same devices are used for the overlapping sessions. If the devices are the same, the process ends as indicated, and otherwise moves to step 1206 to determine if the locations are the same for the overlapping sessions. A negative determination in step 1206 causes the session currently under consideration to be flagged with anomaly code 10008 in step 1208. Otherwise, the process ends without flagging the session with that anomaly code.

Figure 13:
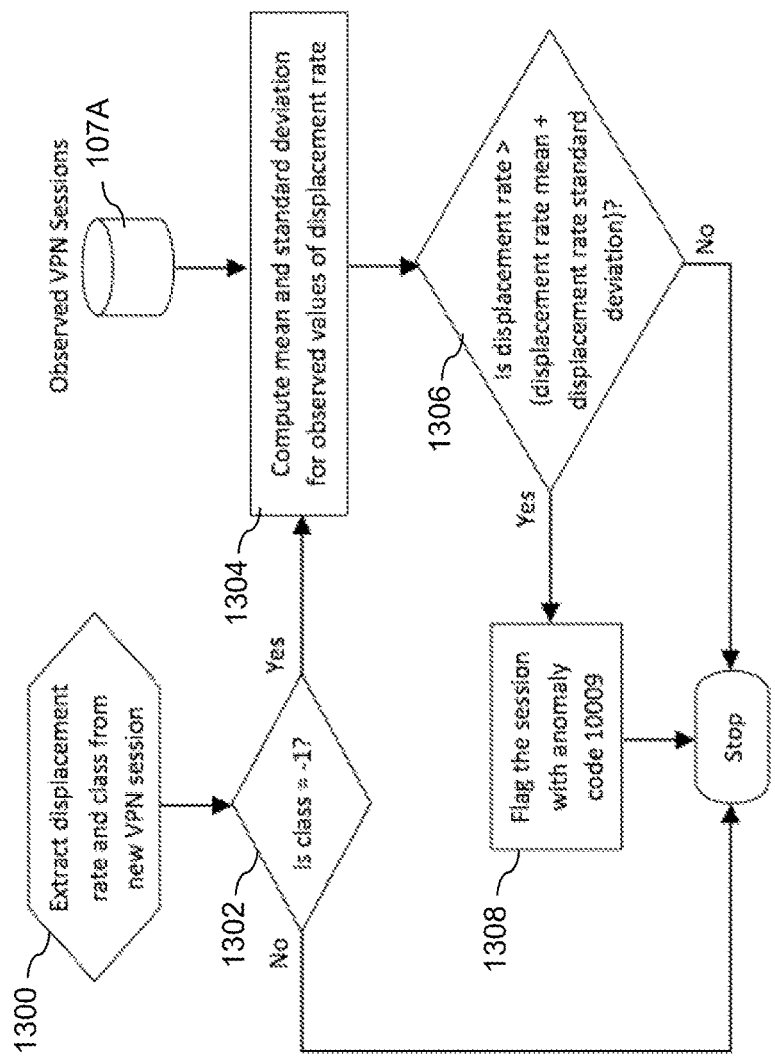

FIG. 13 illustrates a rule that indicates an anomaly if a second network session is initiated from the same user device from which a first network session is initiated, with the first and second network sessions being initiated in respective first and second locations that are more than a threshold distance apart. More particularly, anomaly code 10009 is reported if there is a second VPN session from a distant location that is difficult to reach in the time interval between first and second sessions.

In step 1300, the displacement rate and class are extracted from a new VPN session. Step 1302 then determines if the class is −1, indicating a potentially anomalous session. If the class is not −1, the new network session is considered consistent with the established user behavior pattern, and the process ends as indicated. If the class is −1, the process moves to step 1304 to compute mean and standard deviation for observed values of displacement rate. This involves utilization of the database of observed VPN sessions 107A. Step 1306 then determines if the displacement rate is greater than the corresponding mean plus standard deviation. A negative result from the determination in step 1306 causes the process to end as indicated, but an affirmative result from the determination in step 1306 causes the session to be flagged with anomaly code 10009 in step 1308, after which the process ends as indicated.

Figure 14:
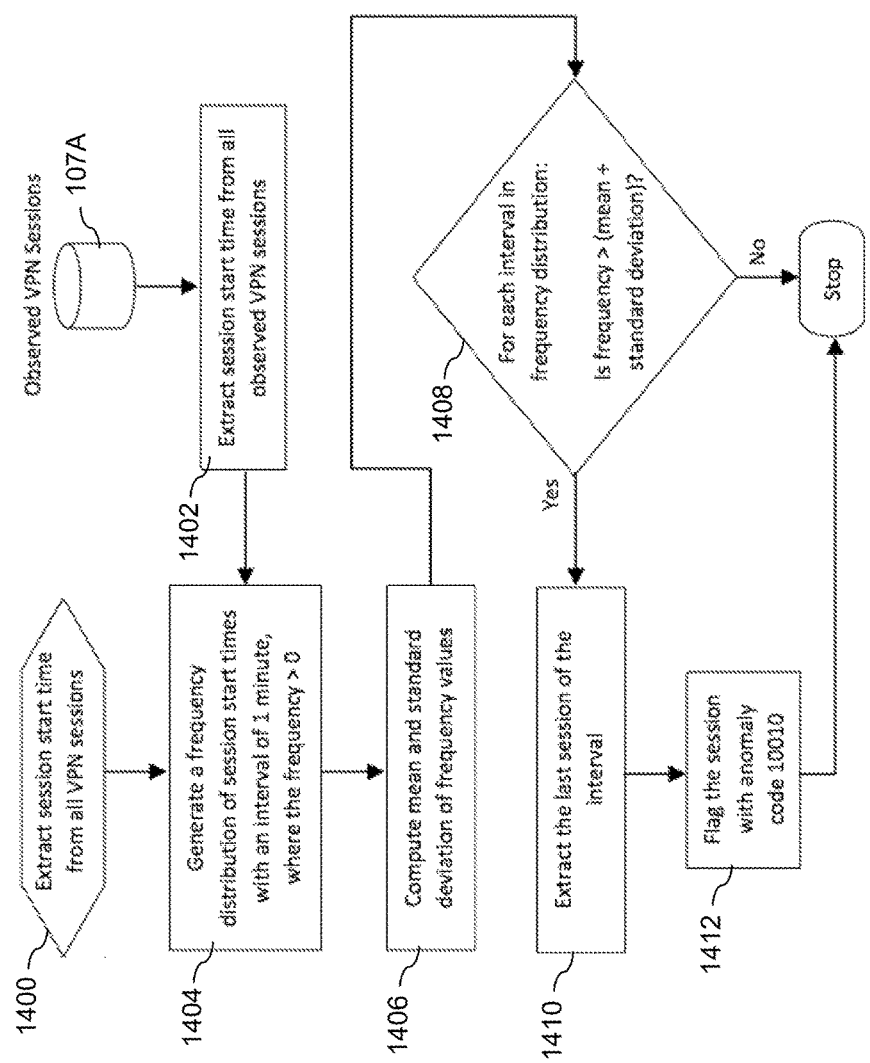

FIG. 14 illustrates a rule that indicates an anomaly if more than a threshold number of network sessions are active in a specified time interval. More particularly, anomaly code 10010 is reported if there are too many VPN sessions for any one of a plurality of time intervals. This example utilizes a frequency distribution of session start times separated into intervals of one minute. This anomaly can be used to identify automated VPN logins commonly associated with security breaches or other attacks.

In step 1400, session start time is extracted from all of the VPN sessions under consideration. Step 1402 similarly extracts the session start time from all of the relevant observed VPN sessions from the database of observed VPN sessions 107A. In step 1404, a frequency distribution of session start times is generated, using intervals of one minute and limiting the frequencies to positive values. For example, the frequency distribution illustratively comprises a histogram with the frequency bins corresponding to respective one-minute intervals. The frequency bins each indicate the number of sessions having start times that fall into the corresponding interval. Step 1406 computes mean and standard deviation for the frequency values of the frequency distribution. A determination is made in step 1408 for each interval in the frequency distribution as to whether or not the corresponding frequency or session count for that interval is greater than the mean plus the standard deviation. A negative result from the determination in step 1408 causes the process to end as indicated. Otherwise, the last session of the interval is extracted in step 1410, and flagged with the anomaly code 10010 in step 1412, after which the process ends.

Figure 15:
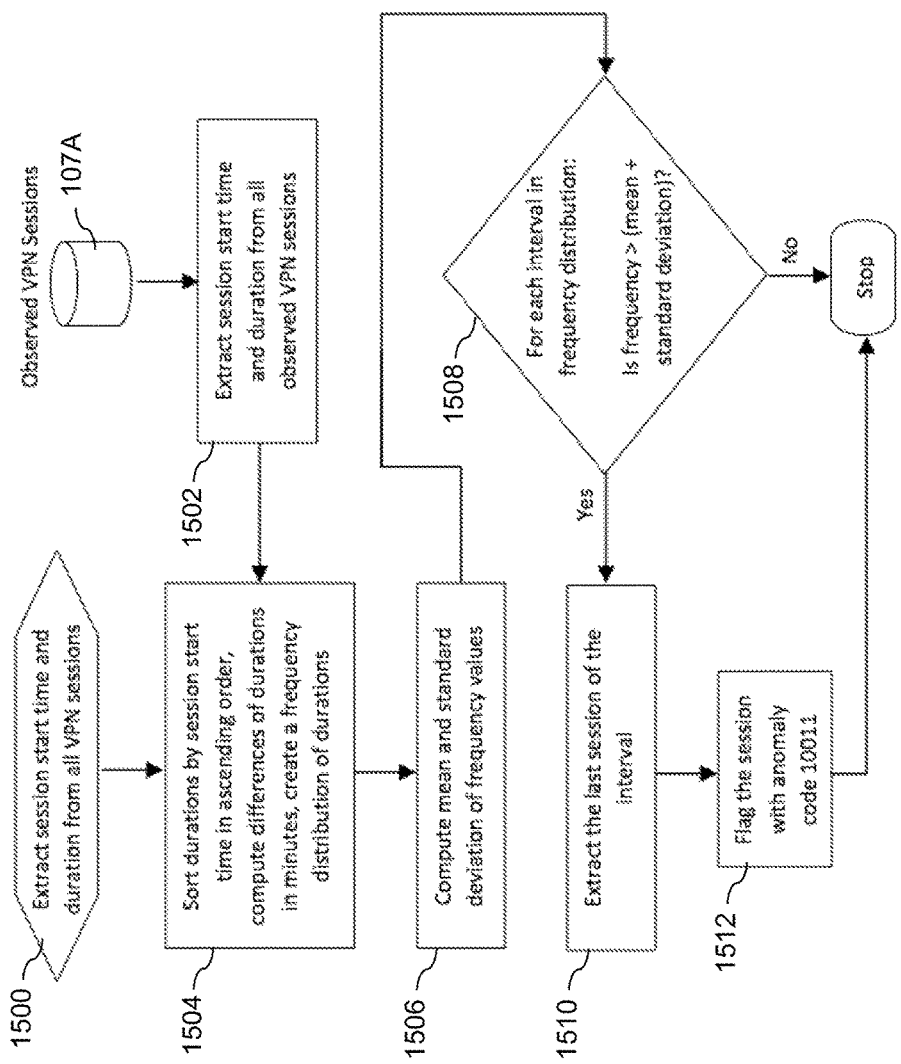

FIG. 15 illustrates a rule that indicates an anomaly if a threshold number of network sessions have substantially the same duration. More particularly, anomaly code 10011 is reported if the VPN sessions have the same duration, within a given time interval of one minute. This anomaly can be used to identify automated VPN logins. The anomaly is not checked for if anomaly code 10000 is already reported for the session under consideration.

In step 1500, session start time and duration are extracted from all of the VPN sessions under consideration. Step 1502 similarly extracts the session start time and duration from all of the relevant observed VPN sessions from the database of observed VPN sessions 107A. In step 1504, the durations are sorted in ascending order of session start time, differences of durations in minutes are computed, and a frequency distribution is created. The frequency distribution includes a plurality of intervals each having a frequency value corresponding to a number of sessions that exhibit the corresponding duration. Step 1506 computes mean and standard deviation for the frequency values of the frequency distribution. A determination is made in step 1508 for each interval in the frequency distribution as to whether or not the corresponding frequency for that interval is greater than the mean plus the standard deviation. A negative result from the determination in step 1508 causes the process to end as indicated. Otherwise, the last session of the interval is extracted in step 1510, and flagged with the anomaly code 10011 in step 1512, after which the process ends.

Figure 16:
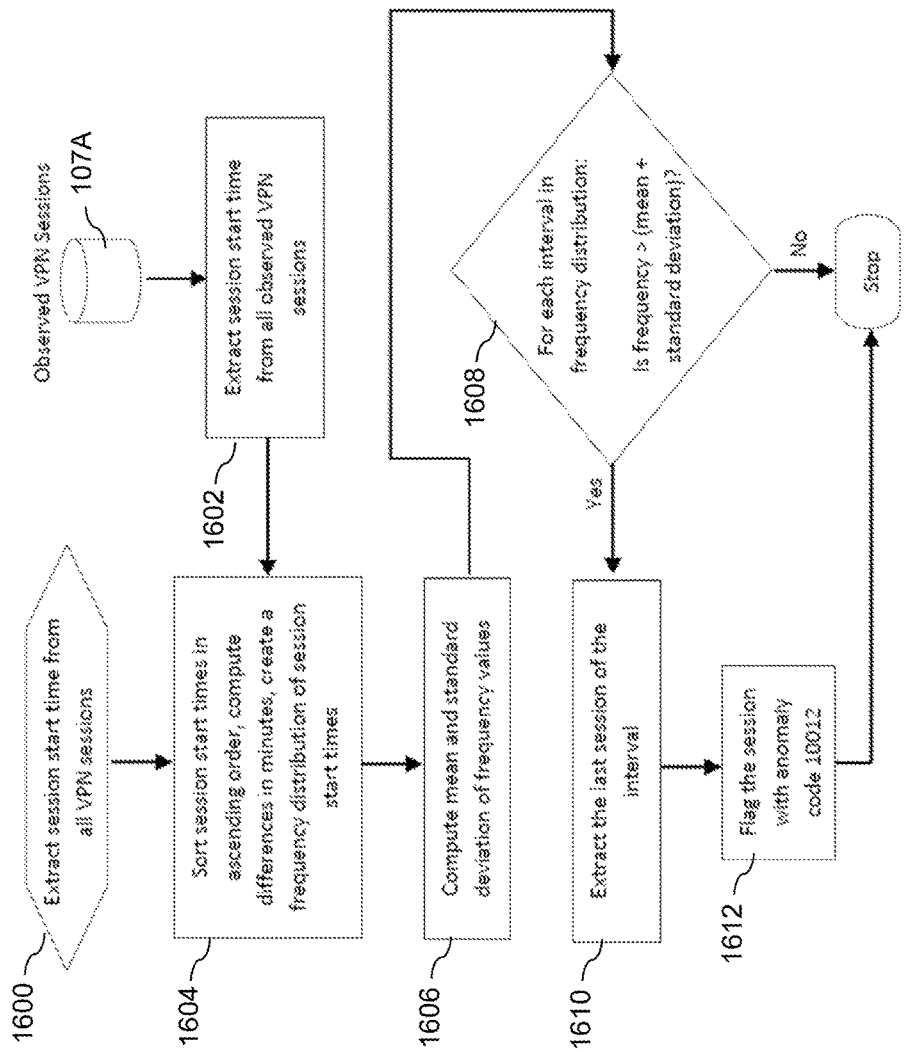

FIG. 16 illustrates a rule that indicates an anomaly if a threshold number of network sessions have substantially the same start time. More particularly, anomaly code 10012 is reported if the VPN sessions have the same start time, within a given time interval of one minute. Again, this anomaly can be used to identify automated VPN logins, and is not checked for if anomaly code 10000 is already reported for the session under consideration.

In step 1600, session start time is extracted from all of the VPN sessions under consideration. Step 1602 similarly extracts the session start time from all of the relevant observed VPN sessions from the database of observed VPN sessions 107A. In step 1604, the session start times are sorted in ascending order, differences of session start times in minutes are computed, and a frequency distribution is created. The frequency distribution includes a plurality of intervals each having a frequency value corresponding to a number of sessions that exhibit the corresponding start time. Step 1606 computes mean and standard deviation for the frequency values of the frequency distribution. A determination is made in step 1608 for each interval in the frequency distribution as to whether or not the corresponding frequency for that interval is greater than the mean plus the standard deviation. A negative result from the determination in step 1608 causes the process to end as indicated. Otherwise, the last session of the interval is extracted in step 1610, and flagged with the anomaly code 10012 in step 1612, after which the process ends.

Figure 17:
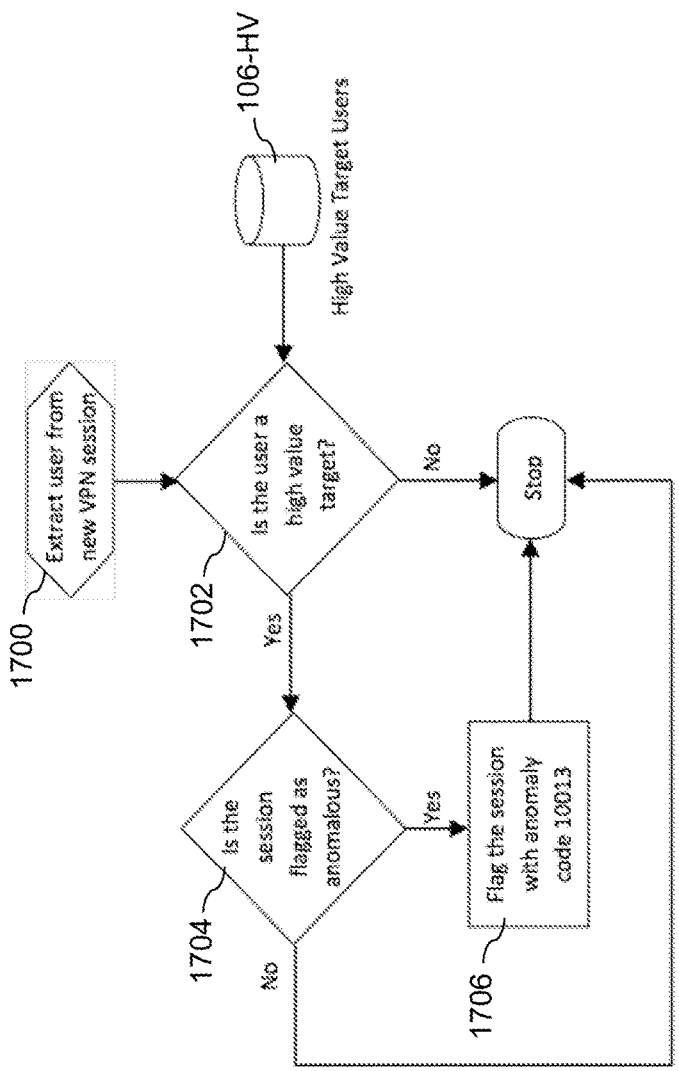

FIG. 17 illustrates a rule that increases an urgency level of an alert if a user identifier falls into a designated group of user identifiers. More particularly, anomaly code 10013 is reported if the user is a high value target and there is at least one other anomaly reported for the VPN session. Such a situation illustratively indicates a need for a quicker response from network security personnel, as the user in question may have access to more important information than other users that are not so identified.

In step 1700, the identity of the user is extracted from a new VPN session. Step 1702 then determines if the user is a high value target, utilizing a database 106-HV of high value target users. If the determination in step 1702 is that the user is not a high value target, the process ends as indicated. Otherwise, a further determination is made in step 1704 as to whether or not the session is already flagged as anomalous under one of the other anomaly codes. A negative result from the determination in step 1704 causes the process to end as indicated. An affirmative result from the determination in step 1704 causes the session to be flagged with anomaly code 10013 in step 1706, after which the process ends.

Although the example rules described in conjunction with respective FIGS. 4 through 17 are collectively applied in the present embodiment, subsets of these rules, or additional or alternative rules, can be used in other embodiments. Moreover, the particular process steps associated with these rules can be varied.

Again, the particular feature extraction, model application, rules-based verification and alert generation arrangements described above and shown in the Appendix are exemplary only, and numerous alternative processing arrangements can be used in other embodiments. Accordingly, the various characteristics of these embodiments are intended to be illustrative only and should not be construed as limiting in any way.

The above-described illustrative embodiments provide significant advantages relative to conventional approaches.

For example, some embodiments are configured to provide detection and verification of anomalous network sessions using an unsupervised learning model that is generated based on multiple user logins through respective VPN connections. Such detection and verification functionality illustratively utilizes multiple extracted features that characterize an expected behavior pattern of a legitimate user. An arrangement of this type makes an impersonation attack much more visible since the attacker needs to mimic many aspects of the typical behavior of a legitimate user.

These and other embodiments can effectively detect common attack vectors such as those that involve use of legitimate user credentials that are stolen by an attacker through phishing, breaking into credential databases, or infecting user devices with malware. The anomalous network session detection and verification in illustrative embodiments is data driven and can detect an attack at an early stage of penetration before an attacker can cause further damage from within an internal network of an enterprise.

Network session based user behavior pattern analysis and associated anomalous session detection and verification as disclosed herein are illustratively utilized as an additional protective measure to supplement conventional credential-based authentication. Drawbacks of conventional credential-based authentication can therefore be avoided in illustrative embodiments. Accordingly, security is improved and the probability of detecting a given attack at an early stage is increased. Furthermore, the risk analysis in some embodiments is applied in a backend network security system and the process is transparent with no adverse impact on usability for legitimate users.

Illustrative embodiments can be advantageously configured to analyze the behavior of users of a VPN or other type of network in real time, and to detect and verify anomalous network sessions for both stationary and mobile users. Moreover, the analysis can be performed for a current session or current set of network sessions for a given user identifier or for one or more previous network sessions or sets of previous network sessions occurring in any given time period for which network sessions data is available.

The unsupervised learning models such as the OCSVM models used in illustrative embodiments become more accurate over time as additional network sessions data is processed for each user identifier. User behavior patterns can be tracked and deviations detected and verified in a wide variety of different security contexts including those involving access to highly sensitive web sites or other protected resources.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, models, features, verification rules, alerts and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

APPENDIX: ANOMALY DETECTION AND
VERIFICATION EXAMPLE

The following example illustrates network session based user behavior pattern analysis and associated anomaly detection and verification as applied to an actual dataset comprising VPN session logs in one embodiment.

Phase 1: Feature Extraction from VPN Session Logs

The following is an observed set of VPN session logs for a particular user having user identifier 'username' on Feb. 20, 2016. The first line is the header followed by nine log entries.

"event_time","hostip_inet","username","hostid","duration","eventcatname","result", "event_description","paddr_inet","stamp","vpn_group","process_service","rbytes", "sbytes","hostname","device_id","macaddr","version", "w_row_hash","w_session_number","w_insert_dt", "w_update_dt"

"2016-02-20 01:59:46","xx.xx.xxx.xxx" "username"," "," ","Network. Connections","Session Attribute endpoint.device.id=R90GR6VE"," ","xx.xx.xxx.xxx", "2016-02-20 01:59:46"," ","DAP"," "," ", " ","R90GR6VE", " " " ","C3661071246309F6DD2D530803CC365D", "53112244","2016-02-22 02:19:01","2016-02-22 02:19:01"

"2016-02-20 01:59:46","xx.xx.xxx.xxx","username"," "," ","Network. Connections"," "," ","xx.xx.xxx.xxx", "2016-02-20 01:59:46"," "," "," "," "," "," ","0050.56c0.0001, 104a.7ddc.167f,0050.56c0.0008,54e e.7560.1300, 104a.7ddc.167b", " ","223E8BFE7FCDCD3F492D6D918111070C", "53112244", "2016-02-22 02:19:01","2016-02-22 02:19: 01"

"2016-02-20 01:59:46","xx.xx.xxx.xxx","username"," "," ","Network. Connections"," "," ","xx.xx.xxx.xxx", "2016-02-20 01:59: 46"," "," "," "," "," "," "," ","Windows 7","05F1213D1D63F577AE600E95CFD89B50", "53112244","2016-02-22 02:19:01","2016-02-22 02:19:01"

"2016-02-20 01:59:46","xx.xx.xxx.xxx","username"," "," ","Network. Connections","Connection AnyConnect: The following DAP records were selected for this connection: DfltAccessPolicy"," ","xx.xx.xxx.xxx","2016-02-20 01:59:46"," ","DAP"," "," "," "," ", " ","DED7D2DCB5B2C0137821F72013957C993E","5311 2244","2016-02-22 02:19:01","2016-02-22 02:19:01"

"2016-02-20 01:59:46","xx.xx.xxx.xxx","username"," "," ","Network. Connections"," "," ","xx.xx.xxx.xxx", "2016-02-20 01:59:46"," ","DAP"," "," ","USCSUSERNAMEL1C", " "," "," "," ","A03018CDACDFF745DOCCA68C 54B6EE65","53112244","2016-02-22 02:19:01","2016-02-22 02:19:01"

"2016-02-20 01:59:55","xx.xx.xxx.xxx","username","10.13.40.226", " ","Network.Connections.Successful"," ","specific address is assigned to session","xx.xx.xxx.xxx","2016-02-20 01:59: 55","SSLVPN-GP", " "," "," "," "," "," ", " "," ","97A390213DCB4682EF6EFE1A46D1325DF", "53112244","2016-02-22 02:19:01","2016-02-22 02:19:01"

"2016-02-20 01:59:56","10.254.223.195","username"," "," ","User.Activity.Successful Logins","AAA user accounting/authentication successful"," ","xx.xx.xxx.xxx","2016-02-20 01:59:56"," "," "," "," "," "," "," ", " ","E6PDDc9cABE71c3A6P4163319cPD9461","5311224 4","2016-02-22 02:19:01","2016-02-22 02:19:01"

"2016-02-20 03:54:30","xx.xx.xxx.xxx","username"," ","6887","Network.Connections.Terminations.VPN", "Idle Timeout", " ","xx.xx.xxx.xxx","2016-02-20 03:54:30","DefaultWEBVPNGroup","SSL", "1234182504","84528600"," "," "," "," ","C18 2622B4E867C063262A0F61816472F","53112244","2016-02-22 02:19:01","2016-02-22 02:19:01"

"2016-02-20

03:54:30","10.254.223.195","username"," "," ","User.Activity.Successful Logins","AAA user accounting/authentication successful"," ","xx.xx.xxx.xxx","2016-02-20 03:54:30"," "," "," "," "," "," "," ",
" ","C8C865F163C8A910F6A3259B8E96A970","53112244","2016-02-22 02:19:01","2016-02-22 02:19:01"

This data is parsed into a single successful VPN session and features are extracted. These include event_name, hostip_inet, username, hostid, duration, rbytes, sbytes and hostname. Derived features include latitude, longitude, x, y, z, location, region, country, displacement_rate, rbytes_rate and sbytes_rate.

event_time,hostip_inet,username,hostid,duration,rbytes, sbytes,hostname,latitude, longitude,x,y,z,location,region, country,displacement_rate,rbytes_rate,sbytes_rate
2016-02-20 01:59:46,xx.xx.xxx.xxx,username,xx.xx.xxx.xxx,6887.0, 1.234182504E9,8.45286E7, usenkeswaal12c,39.9572,-74.9162,1270.8476156923643,-4715.271079386792, 4091.5530041278403,Mount Laurel,N.J.,United States,0.0, 179204.66153622768,12273.645999709597

Phase 2: Detection of Anomalous VPN Session using OCSVM Model

The features extracted from the VPN session are analyzed relative to an observed pattern of user behavior. It is assumed that a separate OCSVM model is trained per user, and is available on demand for use in a classifier. The classifier returns the class attribute as shown below, with a positive value (+1) if the VPN session is normal and a negative value (−1) otherwise. The current example session is classified as a potentially anomalous session.

event_time,hostip_inet,username,hostid,duration,rbytes, sbytes,hostname,latitu de,longitude,x,y,z,location,region, country,displacement_rate,rbytes_rate,sbytes_rate,class
2016-02-20 01:59:46,xx.xx.xxx.xxx,username,xx.xx.xxx.xxx,6887.0, 1.234182504E9,8.45286E7,u senkeswaal12c,39.9572,-74.9162,1270.8476156923643,-4715.271079386792, 4091.5530041278403,Mount Laurel,N.J.,United States,0.0, 179204.66153622768,12273.645999709597,−1.0

Phase 3: Rules-Based Verification of Anomalous VPN Session

The VPN session classified as a potentially anomalous session is subject to rules-based verification. More particularly, the session is verified against the 14 rules corresponding to anomaly codes 10000 to 10013. The anomaly code attribute as shown below identifies the verified anomaly for the VPN session. In this example, the verified anomaly is based on an abnormal amount of data being downloaded, which is anomaly code 10005.

event_time,hostip_inet,username,hostid,duration,rbytes, sbytes,hostname,latitu de,longitude,x,y,z,location,region, country,displacement_rate,rbytes_rate,sbytes_rate,class, anomaly_code
2016-02-20 01:59:46,xx.xx.xxx.xxx,username,xx.xx.xxx.xxx,6887.0, 1.234182504E9,8.45286E7, usenkeswaal12c,39.9572,-74.9162,1270.8476156923643,-4715.271079386792, 4091.5530041278403,Mount Laurel,N.J.,United States,0.0, 179204.66153622768,12273.645999709597,−1.0,10005

What is claimed is:

1. A method comprising steps of:
obtaining data characterizing a plurality of network sessions for a given user identifier wherein the network sessions are initiated from one or more user devices over at least one network;
extracting features from the obtained data;
detecting at least one potentially anomalous network session among the plurality of network sessions for the given user identifier by applying the extracted features to a support vector machine model for the given user identifier; and
applying a rules-based verification process to the detected potentially anomalous network session in order to verify that the detected potentially anomalous network session is an anomalous network session;
generating an alert based at least in part on one or more results of the rules-based verification process;
automatically taking one or more remedial actions over the at least one network relating to the anomalous network session based at least in part on at least one of the one or more results of the rules-based verification process; and
updating the support vector machine model for the given user identifier as part of an unsupervised learning process;
wherein updating the support vector machine model for the given user identifier comprises:
classifying a given one of the network sessions as a non-anomalous network session; and
incorporating the extracted features of the given network session and its classification as a non-anomalous network session into the support vector machine model as a new observation;
wherein the alert is transmitted over said at least one network to a security agent;
wherein the support vector machine model for the given user identifier utilizes a designated function to determine a decision boundary separating normal network sessions within a learned class defining a behavior pattern for the given user identifier from potentially anomalous network sessions not within the learned class, by projecting the data characterizing the plurality of network sessions for the given user identifier as respective data points plotted relative to an origin, the decision boundary separating the plotted data points into a first region comprising the origin and a first subset of the data points representing the potentially anomalous network sessions and a second region comprising a second subset of the data points representing the normal network sessions;
wherein the support vector machine model for the given user identifier is one of a plurality of distinct support vector machine models maintained for respective ones of a plurality of distinct user identifiers, with automated detection of anomalous network sessions for different ones of the distinct user identifiers being based at least in part on respective different ones of the distinct support vector machine models; and
wherein the steps are performed by at least one processing device comprising a processor coupled to a memory.

2. The method of claim 1 wherein the network sessions comprise respective virtual private network (VPN) sessions.

3. The method of claim 1 wherein the support vector machine model comprises a one-class support vector machine model.

4. The method of claim 1 wherein the extracted features of a particular one of the network sessions for the given user identifier comprise a device identifier, an external IP address, an internal IP address, a session start time, a session duration, a number of bytes received during the session and a number of bytes sent during the session.

5. The method of claim 4 wherein the extracted features of the particular network session for the given user identifier further comprise one or more derived features comprising at least a subset of latitude, longitude, location, region, country, displacement rate, download rate and upload rate.

6. The method of claim 1 wherein the given network session classified as a non-anomalous network session comprises one of the plurality of sessions that is not determined to be a potentially anomalous network session.

7. The method of claim 1 wherein the given network session classified as a non-anomalous network session comprises one of the plurality of sessions that is initially determined to be an anomalous network session but wherein that determination is subsequently characterized as a false positive.

8. The method of claim 1 wherein the detected potentially anomalous network session comprises a particular one of the plurality of network sessions that deviates from the behavior pattern of the given user identifier as characterized by the support vector machine model for the given user identifier.

9. The method of claim 1 wherein the support vector machine model utilizes a Gaussian kernel function to determine the decision boundary separating normal network sessions within the learned class defining the behavior pattern for the given user identifier from potentially anomalous network sessions not within the learned class.

10. The method of claim 1 wherein the extracting, detecting, applying and generating steps are applied to a current one of the plurality of network sessions for the given user identifier and wherein previous ones of the plurality of network sessions for the given user identifier are utilized to generate the support vector machine module for the given user identifier.

11. The method of claim 1 wherein the rules-based verification process comprises at least a subset of the following rules:
   a rule that indicates an anomaly responsive to a network session being initiated from a user device not previously associated with the user identifier;
   a rule that indicates an anomaly responsive to a network session being initiated from a country not previously associated with the user identifier;
   a rule that indicates an anomaly responsive to a network session being initiated from a restricted country;
   a rule that indicates an anomaly responsive to a network session being initiated for an inactive user identifier;
   a rule that indicates an anomaly responsive to an abnormal amount of data being downloaded during a network session;
   a rule that indicates an anomaly responsive to an abnormal amount of data being uploaded during a network session;
   a rule that indicates an anomaly responsive to multiple overlapping network sessions being initiated from the same user device at different locations;
   a rule that indicates an anomaly responsive to multiple overlapping network sessions being initiated from different user devices at different locations;
   a rule that indicates an anomaly responsive to a second network session being initiated from the same user device from which a first network session is initiated where the first and second network sessions are initiated in respective first and second locations that are more than a threshold distance apart;
   a rule that indicates an anomaly responsive to more than a threshold number of network sessions being active in a specified time interval;
   a rule that indicates an anomaly responsive to a threshold number of network sessions having substantially the same duration; and
   a rule that indicates an anomaly responsive to a threshold number of network sessions having substantially the same start time.

12. The method of claim 1 wherein an urgency level of the alert is increased responsive to the user identifier falling into a designated group of user identifiers.

13. A non-transitory processor-readable storage medium having stored therein program code of one or more software programs, wherein the program code when executed by at least one processing device causes said at least one processing device:
   to obtain data characterizing a plurality of network sessions for a given user identifier wherein the network sessions are initiated from one or more user devices over at least one network;
   to extract features from the obtained data;
   to detect at least one potentially anomalous network session among the plurality of network sessions for the given user identifier by applying the extracted features to a support vector machine model for the given user identifier; and
   to apply a rules-based verification process to the detected potentially anomalous network session in order to verify that the detected potentially anomalous network session is an anomalous network session;
   to generate an alert based at least in part on one or more results of the rules-based verification process;
   to automatically take one or more remedial actions over the at least one network relating to the anomalous network session based at least in part on at least one of the one or more results of the rules-based verification process; and
   to update the support vector machine model for the given user identifier as part of an unsupervised learning process;
   wherein updating the support vector machine model for the given user identifier comprises:
      classifying a given one of the network sessions as a non-anomalous network session; and
      incorporating the extracted features of the given network session and its classification as a non-anomalous network session into the support vector machine model as a new observation;
   wherein the alert is transmitted over said at least one network to a security agent;
   wherein the support vector machine model for the given user identifier utilizes a designated function to determine a decision boundary separating normal network sessions within a learned class defining a behavior pattern for the given user identifier from potentially anomalous network sessions not within the learned class, by projecting the data characterizing the plurality of network sessions for the given user identifier as respective data points plotted relative to an origin, the decision boundary separating the plotted data points into a first region comprising the origin and a first subset of the data points representing the potentially anomalous network sessions and a second region comprising a second subset of the data points representing the normal network sessions; and
   wherein the support vector machine model for the given user identifier is one of a plurality of distinct support vector machine models maintained for respective ones of a plurality of distinct user identifiers, with automated detection of anomalous network sessions for different ones of the distinct user identifiers being based at least in part on respective different ones of the distinct support vector machine models.

14. The processor-readable storage medium of claim 13 wherein the detected potentially anomalous network session comprises a particular one of the plurality of network sessions that deviates from the behavior pattern of the given user identifier as characterized by the support vector machine model for the given user identifier.

15. The processor-readable storage medium of claim 13 wherein the support vector machine model utilizes a Gaussian kernel function to determine the decision boundary separating normal network sessions within the learned class defining the behavior pattern for the given user identifier from potentially anomalous network sessions not within the learned class.

16. An apparatus comprising:
at least one processing device comprising a processor coupled to a memory;
said at least one processing device being configured:
to obtain data characterizing a plurality of network sessions for a given user identifier wherein the network sessions are initiated from one or more user devices over at least one network;
to extract features from the obtained data;
to detect at least one potentially anomalous network session among the plurality of network sessions for the given user identifier by applying the extracted features to a support vector machine model for the given user identifier; and
to apply a rules-based verification process to the detected potentially anomalous network session in order to verify that the detected potentially anomalous network session is an anomalous network session;
to generate an alert based at least in part on one or more results of the rules-based verification process; and
to automatically take one or more remedial actions over the at least one network relating to the anomalous network session based at least in part on at least one of the one or more results of the rules-based verification process; and
to update the support vector machine model for the given user identifier as part of an unsupervised learning process;
wherein updating the support vector machine model for the given user identifier comprises:
classifying a given one of the network sessions as a non-anomalous network session; and
incorporating the extracted features of the given network session and its classification as a non-anomalous network session into the support vector machine model as a new observation;
wherein the alert is transmitted over said at least one network to a security agent;
wherein the support vector machine model for the given user identifier utilizes a designated function to determine a decision boundary separating normal network sessions within a learned class defining a behavior pattern for the given user identifier from potentially anomalous network sessions not within the learned class, by projecting the data characterizing the plurality of network sessions for the given user identifier as respective data points plotted relative to an origin, the decision boundary separating the plotted data points into a first region comprising the origin and a first subset of the data points representing the potentially anomalous network sessions and a second region comprising a second subset of the data points representing the normal network sessions; and
wherein the support vector machine model for the given user identifier is one of a plurality of distinct support vector machine models maintained for respective ones of a plurality of distinct user identifiers, with automated detection of anomalous network sessions for different ones of the distinct user identifiers being based at least in part on respective different ones of the distinct support vector machine models.

17. The apparatus of claim 16 wherein the detected potentially anomalous network session comprises a particular one of the plurality of network sessions that deviates from the behavior pattern of the given user identifier as characterized by the support vector machine model for the given user identifier.

18. The apparatus of claim 16 wherein the support vector machine model utilizes a Gaussian kernel function to determine the decision boundary separating normal network sessions within the learned class defining the behavior pattern for the given user identifier from potentially anomalous network sessions not within the learned class.

19. The apparatus of claim 16 wherein the given network session classified as a non-anomalous network session comprises one of the plurality of sessions that is not determined to be a potentially anomalous network session.

20. The apparatus of claim 16 wherein the given network session classified as a non-anomalous network session comprises one of the plurality of sessions that is initially determined to be an anomalous network session but wherein that determination is subsequently characterized as a false positive.

* * * * *